United States Patent [19]

Parsons et al.

[11] Patent Number: 5,303,142
[45] Date of Patent: Apr. 12, 1994

[54] CONTROL SYSTEM FOR GAS TURBINE HELICOPTER ENGINES AND THE LIKE

[75] Inventors: Douglas A. Parsons, Enfield; Mark A. Johnston, Windsor; John E. Games, Granby; Gerald L. DePardo, Glastonbury, all of Conn.

[73] Assignee: United Technologies Corporation, Hartford, Conn.

[21] Appl. No.: 87,347

[22] Filed: Jul. 2, 1993

Related U.S. Application Data

[60] Continuation of Ser. No. 967,335, Oct. 28, 1992, abandoned, which is a division of Ser. No. 418,359, Oct. 6, 1989, Pat. No. 5,189,620.

[51] Int. Cl.$^5$ .............................................. G05B 13/02
[52] U.S. Cl. ..................................... 364/160; 364/165
[58] Field of Search ............... 364/160, 161, 162, 163, 364/164, 165, 431.02, 148; 318/609, 610

[56] References Cited

U.S. PATENT DOCUMENTS

| | | | |
|---|---|---|---|
| 3,940,593 | 2/1976 | Bleak et al. ........................ | 364/181 |
| 4,133,615 | 1/1979 | Zitelli et al. ....................... | 415/43 |
| 4,139,887 | 2/1979 | Levesque, Jr. ...................... | 364/161 |
| 4,313,165 | 1/1982 | Clelford et al. .................. | 364/161 X |
| 4,675,804 | 6/1987 | Wiemer ............................... | 364/161 |
| 4,719,561 | 1/1988 | Shigemasa ....................... | 364/163 X |
| 4,878,165 | 10/1989 | Gotou et al. .................... | 364/161 X |
| 4,951,191 | 8/1990 | Hiroi et al. ......................... | 364/165 |

Primary Examiner—Thomas G. Black
Assistant Examiner—Collin W. Park
Attorney, Agent, or Firm—Richard H. Kosakowski

[57] ABSTRACT

A engine control system for helicopters and the like in which free turbine speed is isochronously controlled by a more robust control system having increased bandwidth due to loop architecture and filter implementation accomplished via closed loop control. Dual notch (feedback compensation) is used with design forward path compensation, including variable lead/position of the lead, variable gain and implementation of integrator/proportional. Superior transient control is achieved by the use of a multi-loop governing design using different error compensations when on "NF" loop control and when not on "NF" loop control, and with "bumpless" inner loop reference by the combination of compensation switching and re-initialization of a common integrator. Parallel select logic with dynamic compensation is used separating the system control loops and the selection process of the controlling functions, as they pertain to the application of control loops designed form small signal stability to large transients. A torque loop limitation as a direct function of the speed loop gains provides a predetermined limit to the governed speed excursion in the event of an in-range failure of the torque signal, or an unannounced fail fix on one engine or system of the twin engine application.

6 Claims, 19 Drawing Sheets

| FIG.2A | FIG.2B |

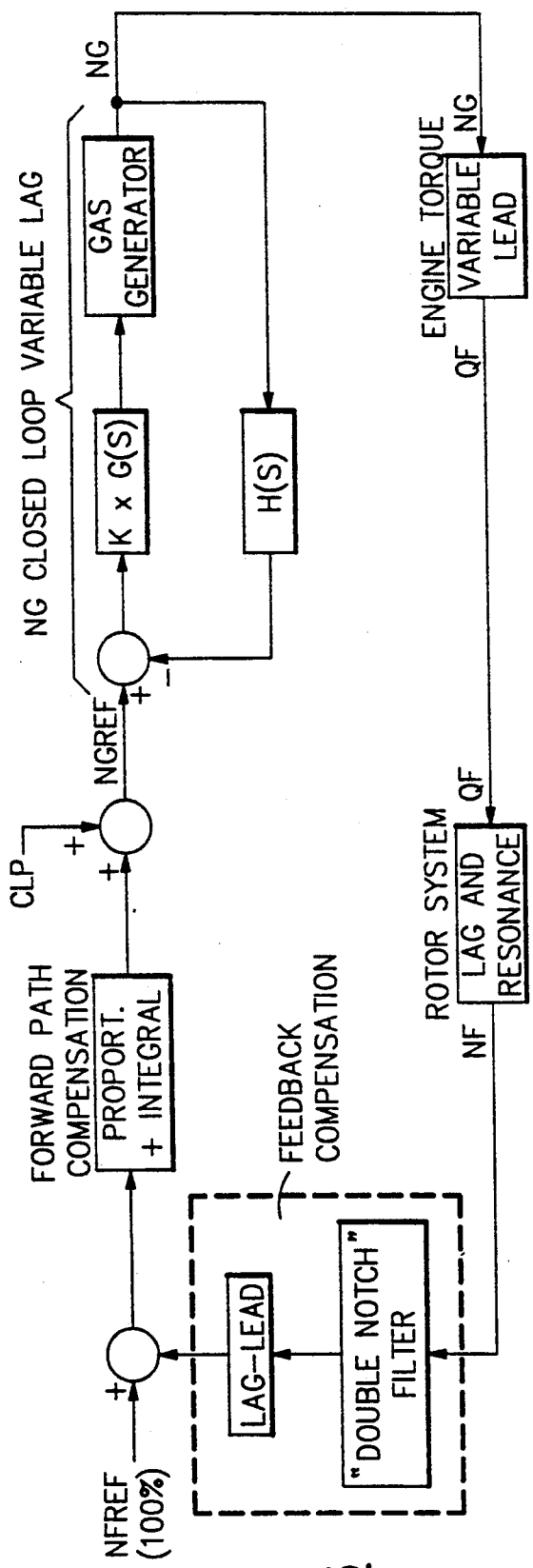

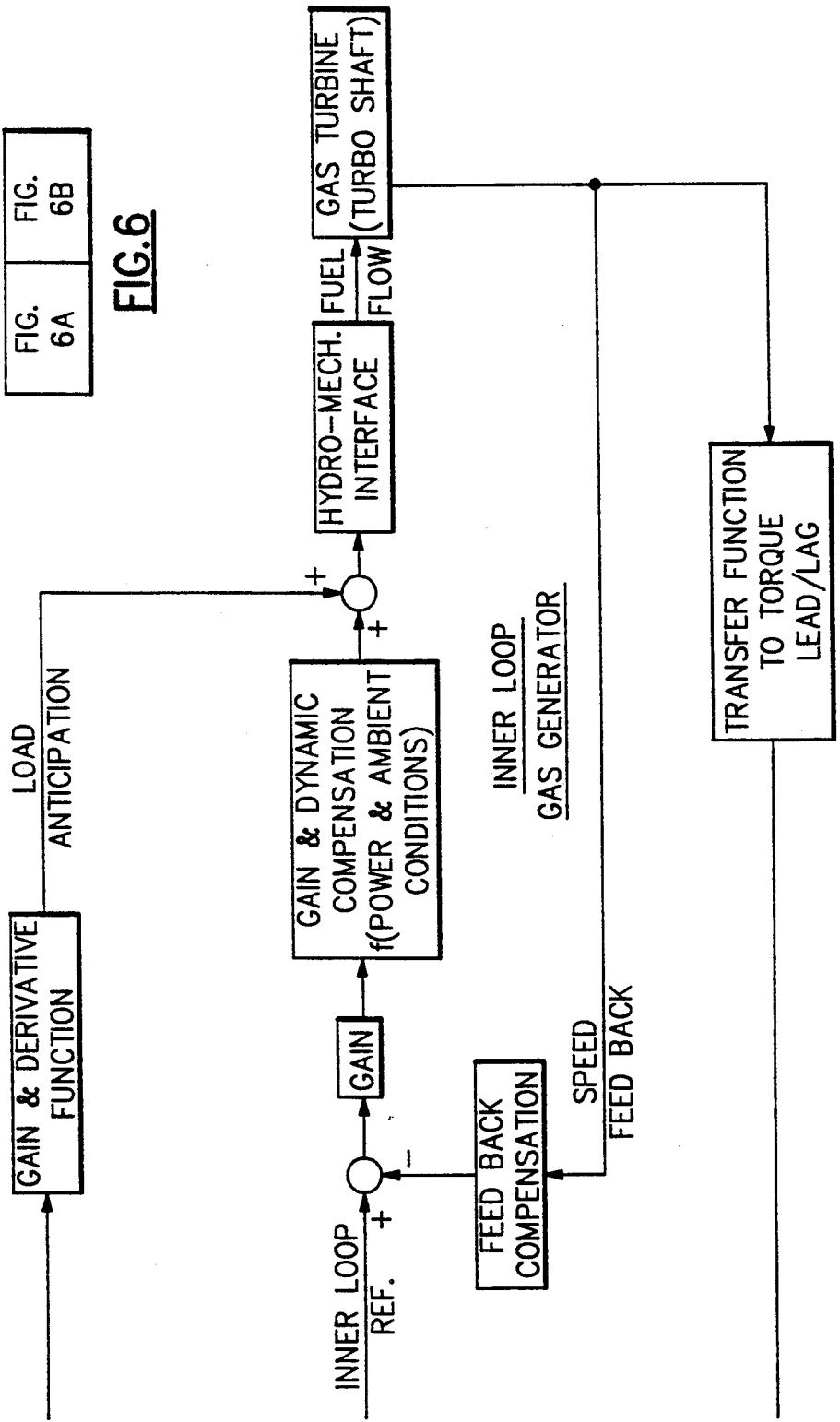

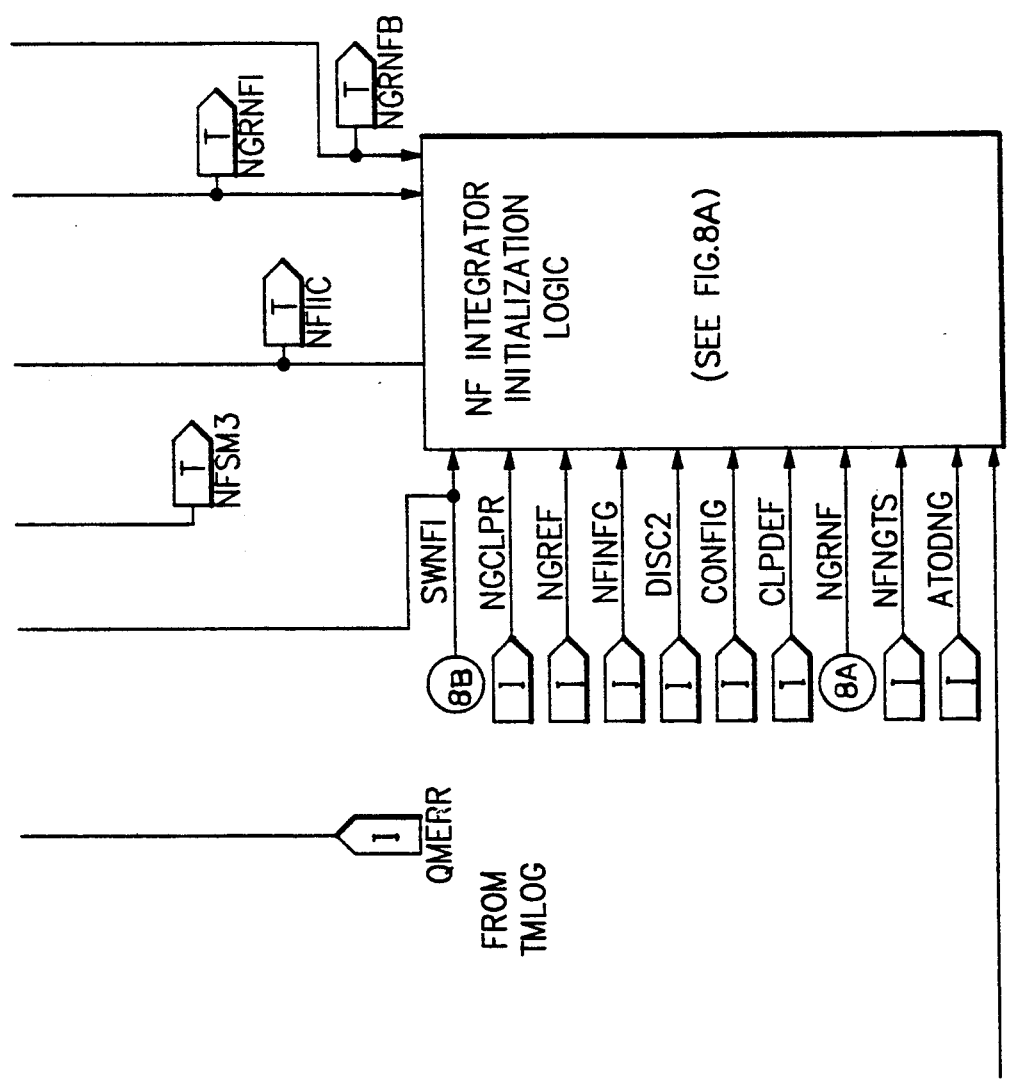

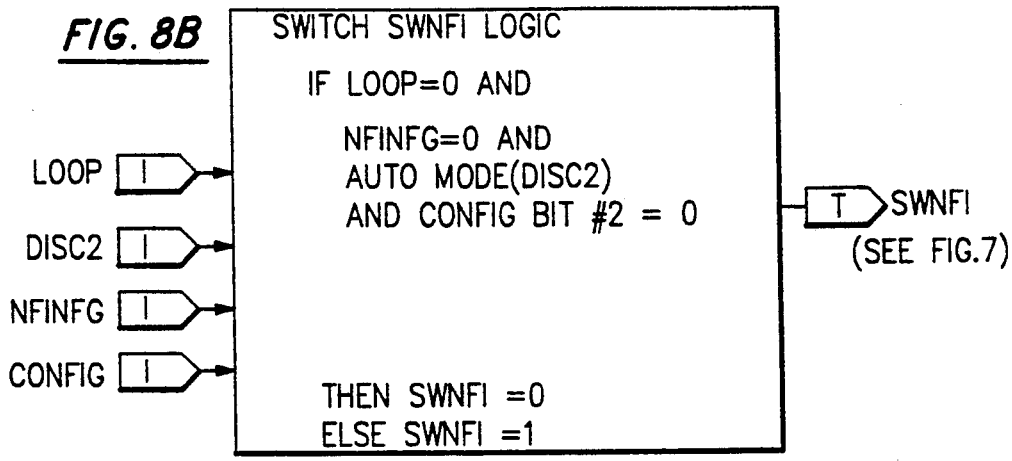
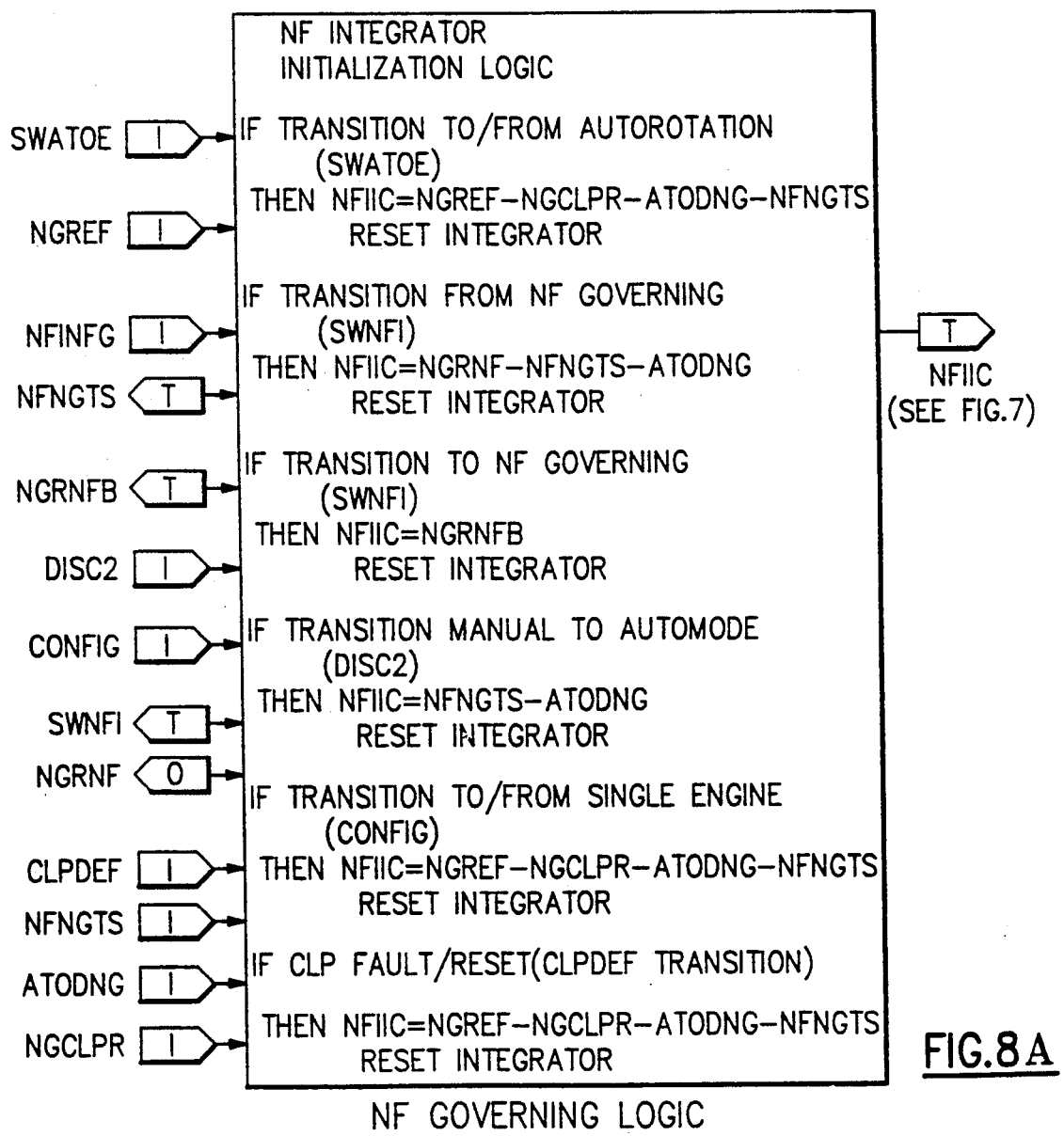

CONTROL SYSTEM FOR GAS TURBINE HELICOPTER ENGINES AND THE LIKE

This is a continuation of co-pending application Ser. No. 07/967,335, filed Oct. 28, 1992, now abandoned, which itself is a division application of application Ser. No. 07/418,359, filed on Oct. 6, 1989, now U.S. Pat. No. 5,189,620, issued Feb. 23, 1993.

TECHNICAL FIELD

The present invention relates to an electronic engine control system and to the fuel control subsystems thereof, for, for example, the twin gas turbine engines in a helicopter. The present invention is more particularly directed to various aspects of the system architecture for such control systems and even more particularly to
an increased bandwidth through closed loop control;
a multi-loop control of a single function;
parallel select logic with dynamic compensation; and
torque loop limitation/matching as a direct function of speed loop gains; in such engine control systems.

BACKGROUND ART

In electronic engine control systems for, for example, twin gas turbine engines used in helicopters, it is desirable to control the free turbine speed isochronously at a fixed reference point, for example, at one hundred (100%) percent. Isochronously refers to there being no error between a reference signal and a feedback signal.

It is also desirable in such a system to have a more robust control system with increased bandwidth. Additionally, it is desirable to provide isochronous control, while expanding the transient bandwidth without associated integrator problems. These desirable attributes are achieved as part of the present invention.

It is also desirable to have superior control system performance in such a system. For example, normal speed governing typically involves a proportional-plus-integral (P+I) approach, when the free turbine speed (NF) loop is commanding fuel flow. When direct free turbine speed (NF) control is overridden by another control loop [e.g., acceleration (accel.), deceleration (decel.)]via the control loop selection logic, the NF error is operated upon by a proportional-plus-differential (P+D) approach. In the invention superior transient control is achieved through the use of a multi-loop speed governing design, as will be explained more fully below.

Additionally, there are a number of problems in the helicopter engine control art currently encountered in present control selection processes (e.g., overshoot/ring or early cut back). For example, a "stiff" rate limit will delay selection of the limit function, allowing an overshoot of the limiter, when used in conjunction with a well damped loop gain function to also reduce the system "ring" or "hard cut back" due to hitting the loop hard. In the invention a rate limit feature, added to the limit loop selection and control process, provides a method for control of the rate of approach to the limits built into the control system. The rate limit technique of the invention allows maximum use of available plant performance.

Thus, three aspects of the present invention meet these desires of the prior art or obviate these prior art problems particularly in the helicopter engine control art, as well as provide innovations applicable to engine control generally, whether single or multiple engine(s) systems and whether in helicopter or other applications, and even in some instances to the control of functions generally.

Additionally, it is noted that controls mounted in twin engine (e.g. gas turbine) helicopter applications generally require control of both output shaft speed and torque matching, presenting significant problems in terms of the failure mode effects of the torque input. A final aspect of the present invention provides a predetermined limit to the governed speed excursion in event of an in-range failure of the torque signal, or an unannounced fail fix of one engine or system.

With respect to this aspect of the invention, it is noted that current torque matching algorithms provide a path for significant speed excursions in the event of a failure, (e.g., incorrect bias, counter problems, "fail fix" on one engine, etc.). To limit this problem, the general, prior art practice has been to severely limit the torque matching gain, and therefore the effectiveness of the loop. The torque matching bias and the speed loop bias both contribute to the inner loop reference.

The torque matching problem arises when the error in the torque match loop cannot be closed (this problem can have many causes), and the difference causes a constant bias to the speed governing loop. In this case the speed loop is required to correct for this torque match error, causing a speed governing error proportional to the relative gains of the speed governing loop and the torque matching loop and opposite in sign. This problem is compounded in isochronous controls, as used in the exemplary electronic engine control design of the invention, because a steady state error can iterate to the extremes of the integrator limits.

DISCLOSURE OF INVENTION

Thus, it is the basic object of the present invention to solve, overcome and/or avoid these various, prior art problems, particularly, for example, in electronic engine control systems for either single engine or twin engine installations, particularly for twin engine applications used in helicopters and the like.

However, with respect to the latter, preferred application, it should be understood that, except for the torque matching aspect of the invention, the principles of the present invention can be applied to many different control applications, whether in association with an engine or not, whether single or multiple engines and whether gas turbine or not and whether in a helicopter application or not. Additionally, even for the torque matching aspect of the invention, such is applicable not only to the preferred helicopter twin turbine engine art, but also to multiple function control systems generally.

Each major aspect of the present invention will, to a large extent, be separately treated below.

Increased Bandwidth Robustness

One aspect of the present invention is to provide a robust control that provides increased bandwidth due to loop architecture and filter implementation used in the control system. In this aspect of the invention this increased bandwidth is accomplished via closed loop control. The invention provides transient response characteristics that accommodate load changes common in, for example, helicopter applications that cannot be predicted from the data sources available.

As will be understood from the detailed description below, novel parts of this enhanced, closed loop robustness or "increased bandwidth" aspect of the invention include, inter alia:

1) the use of "dual notch" filtering in feedback compensation; and 2) design forward path compensation, with -
a) variable lead/position of lead,
b) variable gain, and
c) implementation of integrator/proportional.

It thus a further object of the present invention to provide transient response characteristics that accommodate load changes common in, for example, helicopter applications that cannot be predicted from the data sources available.

Multi-Loop Control of Single Function

Another aspect of the control system architecture of the invention is to provide isochronous control while expanding the transient bandwidth without the usual, associated integrator problems. In this aspect of the invention superior transient control is achieved by the use of a multi-loop governing design.

As will be understood from the detailed description below, the achievements of this "multi-loop control of a single function" aspect of the invention include, inter alia:

1. superior transient performance achieved by using different error compensation when on free turbine speed ("NF") loop control then when not on "NF" loop control; and 2. "bumpless" (i.e., smoothly continuous) inner loop reference by the combination of governing error compensation switching and re-initialization of a common integrator.

Parallel Select Logic with Dynamic Compensation

In another aspect of the control system architecture of the present invention, there is a separation of the system control loops and the selection process of the controlling functions, as this pertains to the application of control loops designed for "small signal stability" to large transients. The invention's separation of the control and selection process provides an avenue for superior control system performance by the optimization of the compensations to the control system output functions.

As will be understood from the detailed description below, novel parts and achievements of this "parallel select logic with dynamic compensation" aspect of the invention include, inter alia:

1. independent loop selection and control paths, allowing superior large transient control performance;

2. loop selection path dynamic compensation, independent of control path compensation, allowing superior anticipation for control loop selection; and 3. rate limit compensation of control system limit functions to allow controlled overshoot of the limit functions, while limiting system "ring" or "hard cut backs".

The rate limit feature, added to the selection compensation of the limit loops, provides a method for control of the rate of approach to the limits built into the control system. As noted above, this technique eliminates a number of problems currently encountered in present control selection processes (e.g., overshoot/ring or early cut back). This rate limit technique allows maximum use of available plant performance.

Torque Loop Limitation Based on Speed Loop Gains

Finally, as noted above, controls mounted in twin engine (gas turbines) helicopter applications generally require control of both output shaft speed and torque matching between engine outputs, presenting significant problems in terms of control and failure modes of the torque input. The logic package described herein provides a predetermined limit to the possible governed speed excursion in the event of an in-range failure of the torque signal, or an unannounced fail fix on one engine or system.

It thus another object of the present invention to limit maximum speed excursion (steady state and transients) due to an in-range torque failure or an unannounced fail fixed, without compromising the torque match loop bandwidth of the control system; especially by the use of predetermined allowed speed governing error and the ratio of the desired loop gains for the speed governing loop and the torque matching loop.

Other features and advantages will be apparent from the specification and claims and from the accompanying drawings, which illustrate at least one exemplary embodiment of the invention.

BRIEF DESCRIPTION OF THE DRAWINGS

FIG. 3 is a block diagram of the control system implementation for the proportional-plus-integral (P+I) section appearing in the upper, left hand portion of FIG. 2, showing its control aspects.

FIG. 4 is a block diagram with transfer function with a related mathematical expression of an exemplary implementation for the control system embodiment of FIG. 3 using the improved integral plus proportional compensation of the invention.

Figure 5:
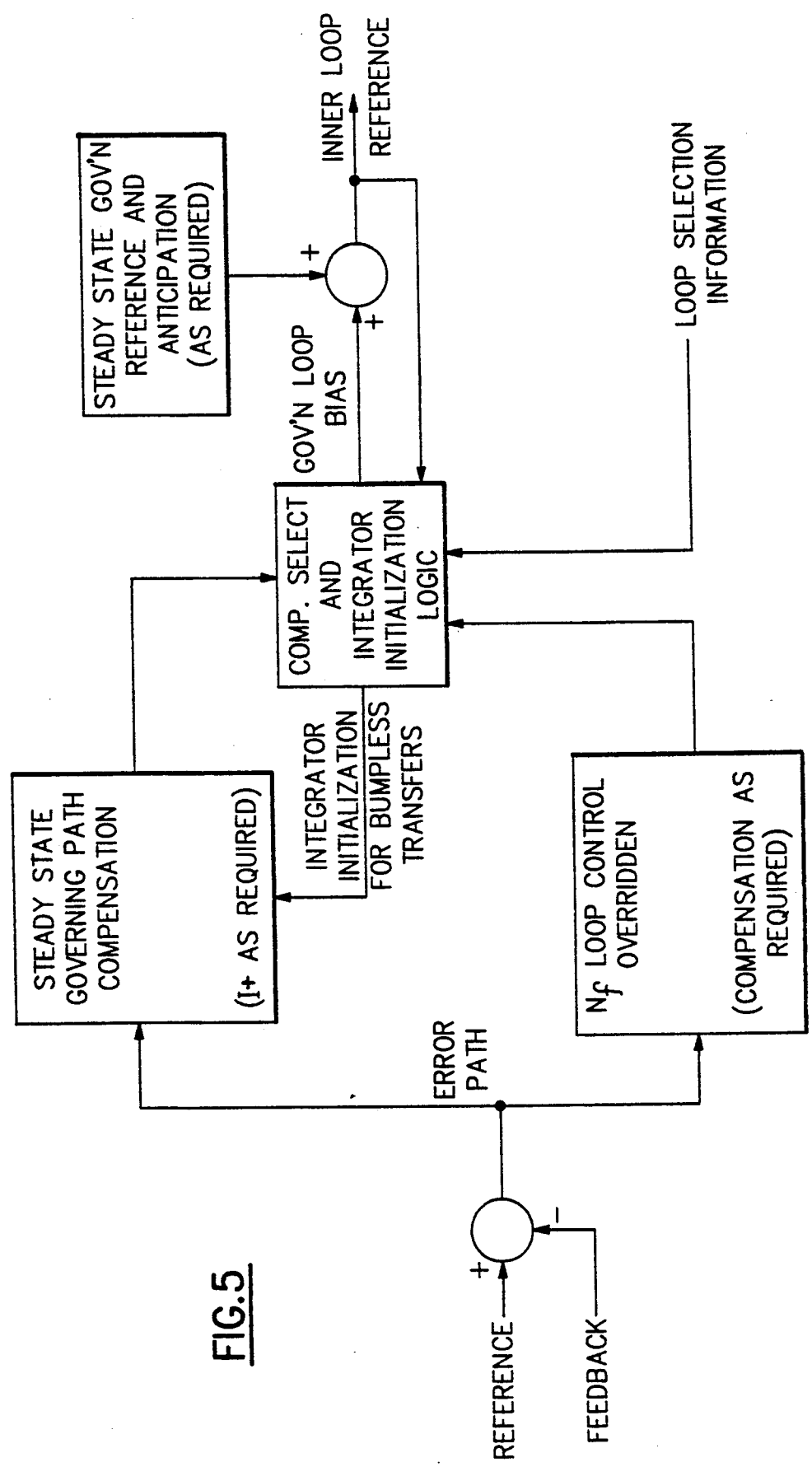
FIG. 5 is a block diagram including an overview of the multi-loop control of a single function in accordance with the principles of one aspect of the present invention.
Figure 6A:
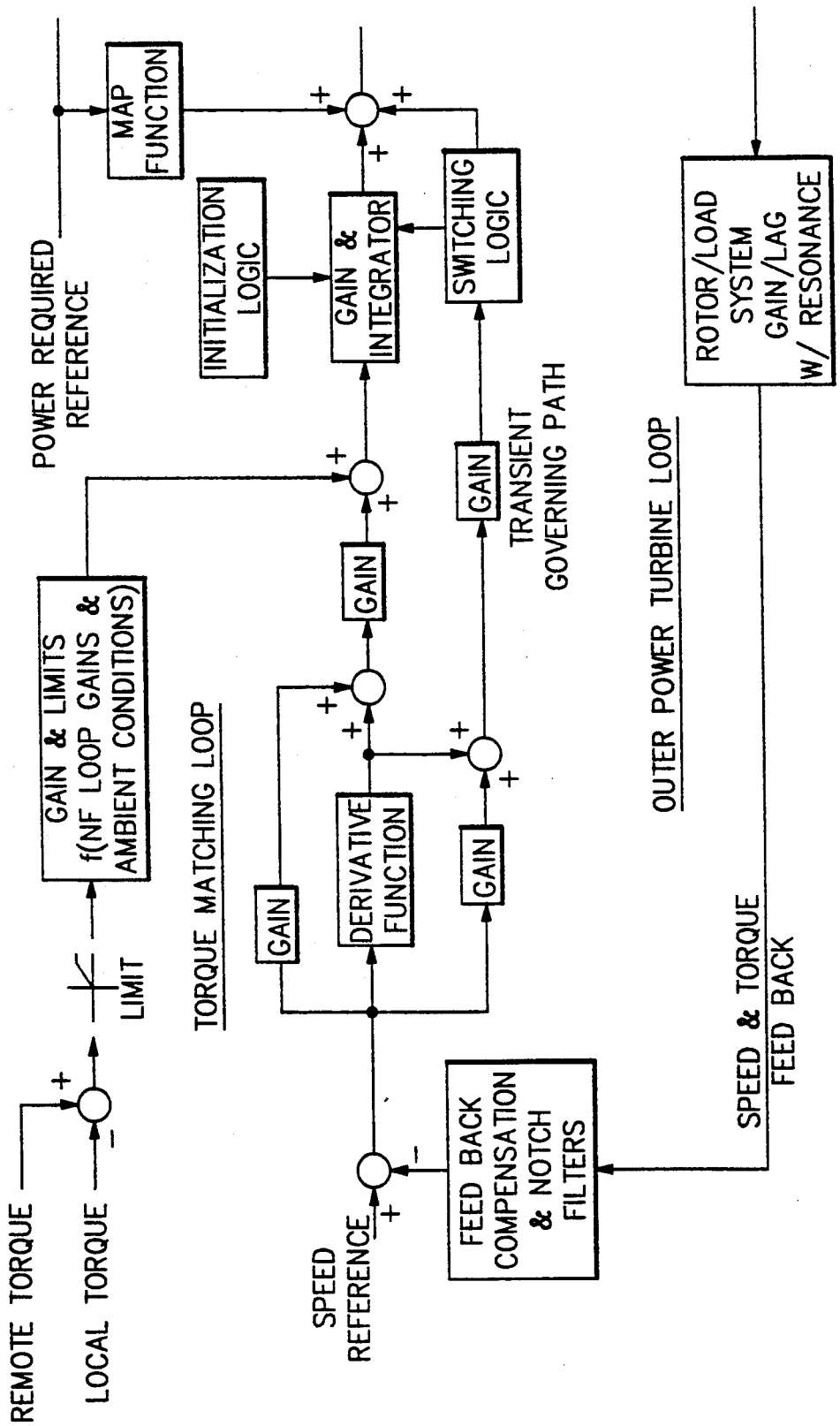
FIG. 6 (combining FIGS. 6A and 6B) is a block diagram of an exemplary free turbine governing design with torque matching, providing a functional decomposition of FIG. 5.

It is noted that FIG. 5 presents a conceptual overview of the preferred, exemplary "multi-loop control of a single function" embodiment of the invention, while FIG. 6 provides a more detailed representation thereof, particularly of the "steady state governing path compensation" block of the former.

Figure 7A:
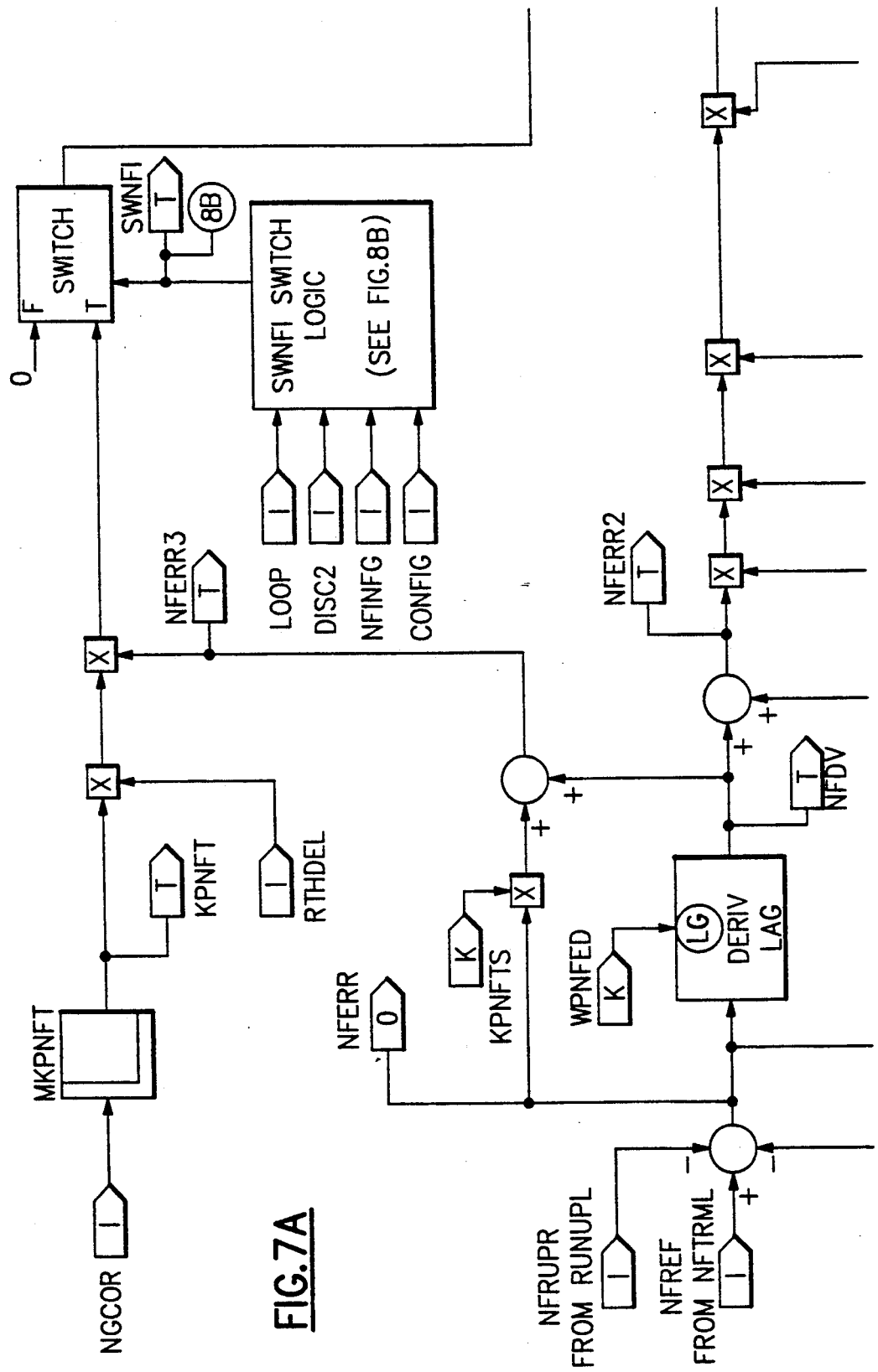
Figure 7B:
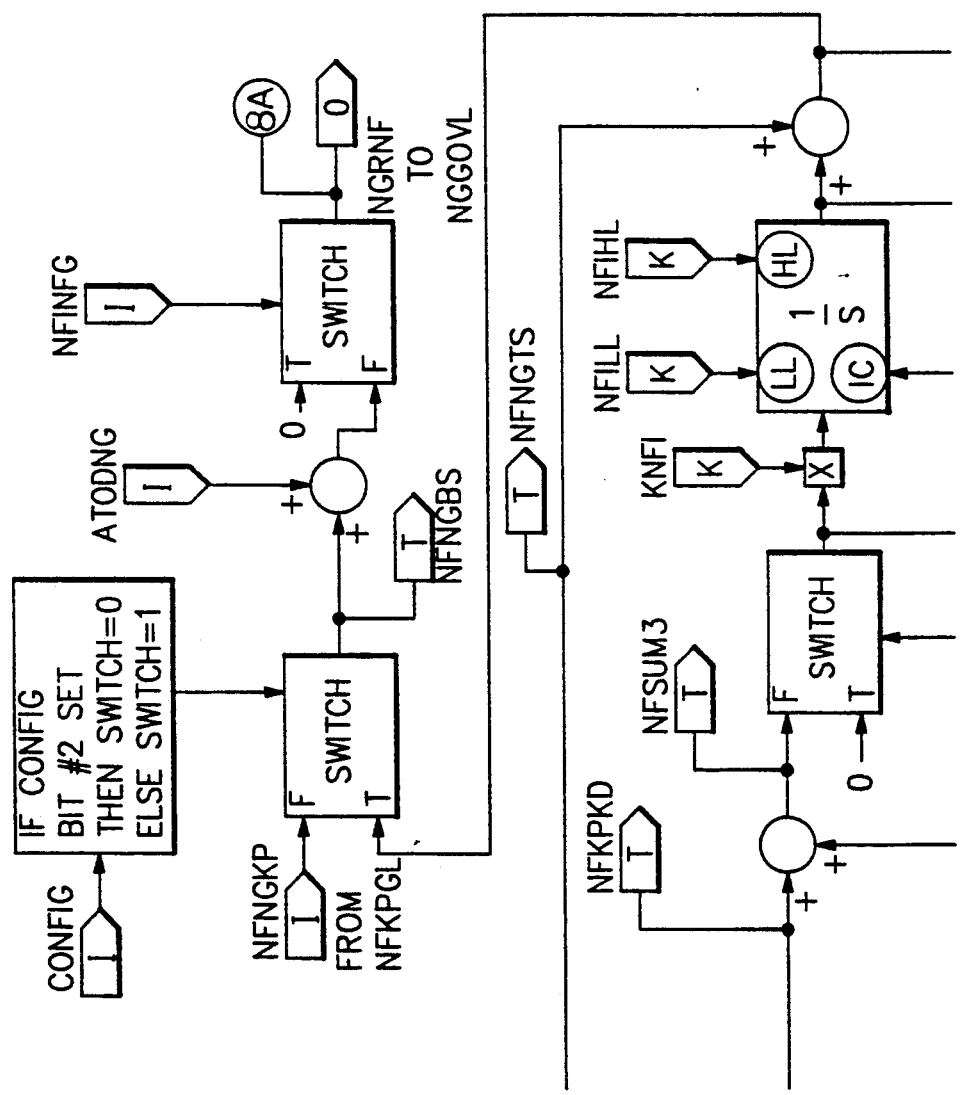
Figure 7C:
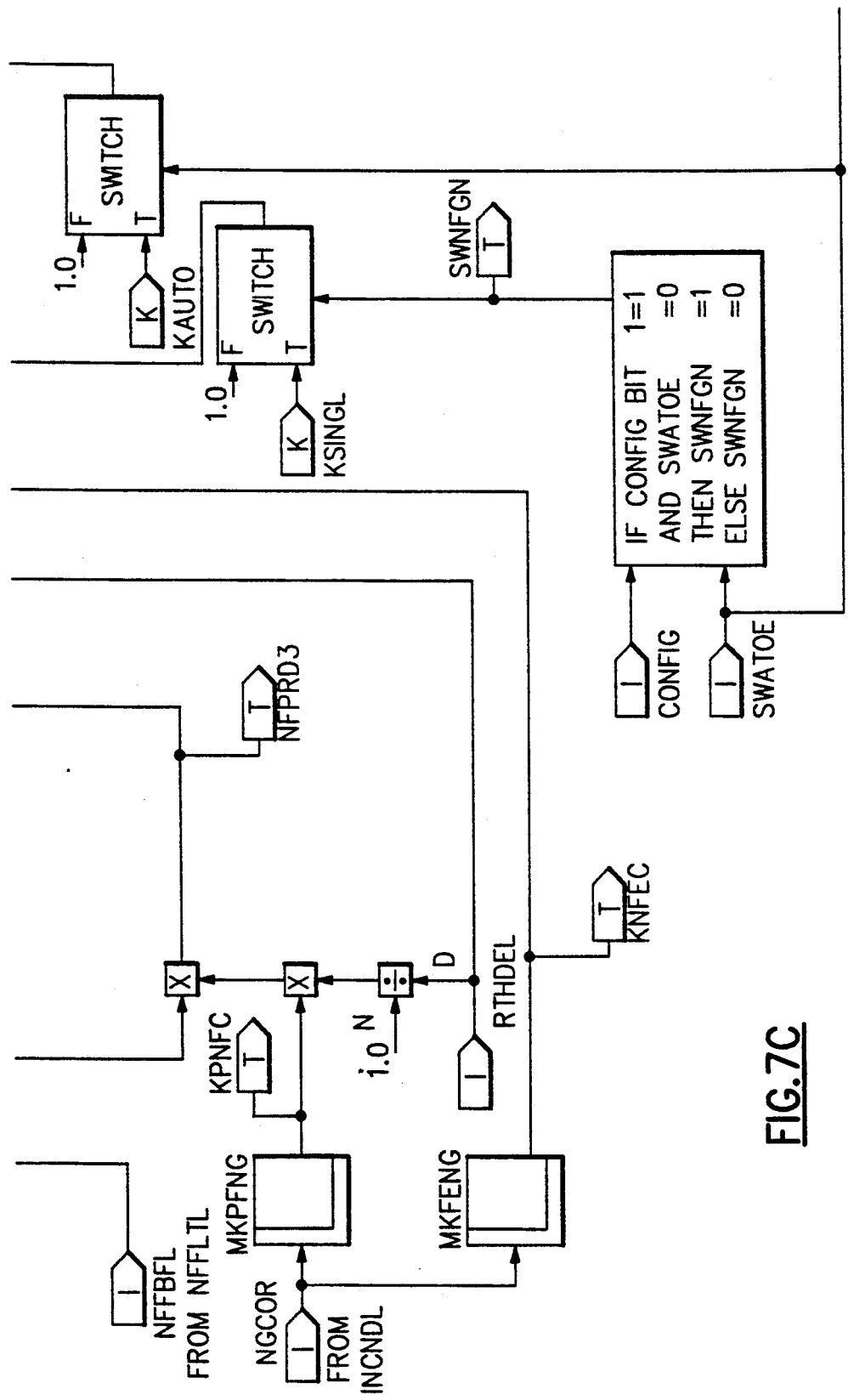

FIG. 7 (combining FIGS. 7A-7D) is a block diagram illustrating the "NF" governing logic; while FIG. 8 (combining FIGS. 8A and 8B) is a block diagram of the "NF" Governing Logic used in certain blocks of FIG. 7.

It is noted that FIGS. 7 and 8 provide a detailed, exemplary implementation of the "Comp. (compensation) select and Integrator Initialization Logic" block of FIG. 5 for the NF governing logic, with FIG. 8 providing detailed, exemplary "if/then/else" logic steps for the "SWNFI Switch Logic" and "NF Integrator Initialization Logic" blocks of FIG. 7.

Figure 9:
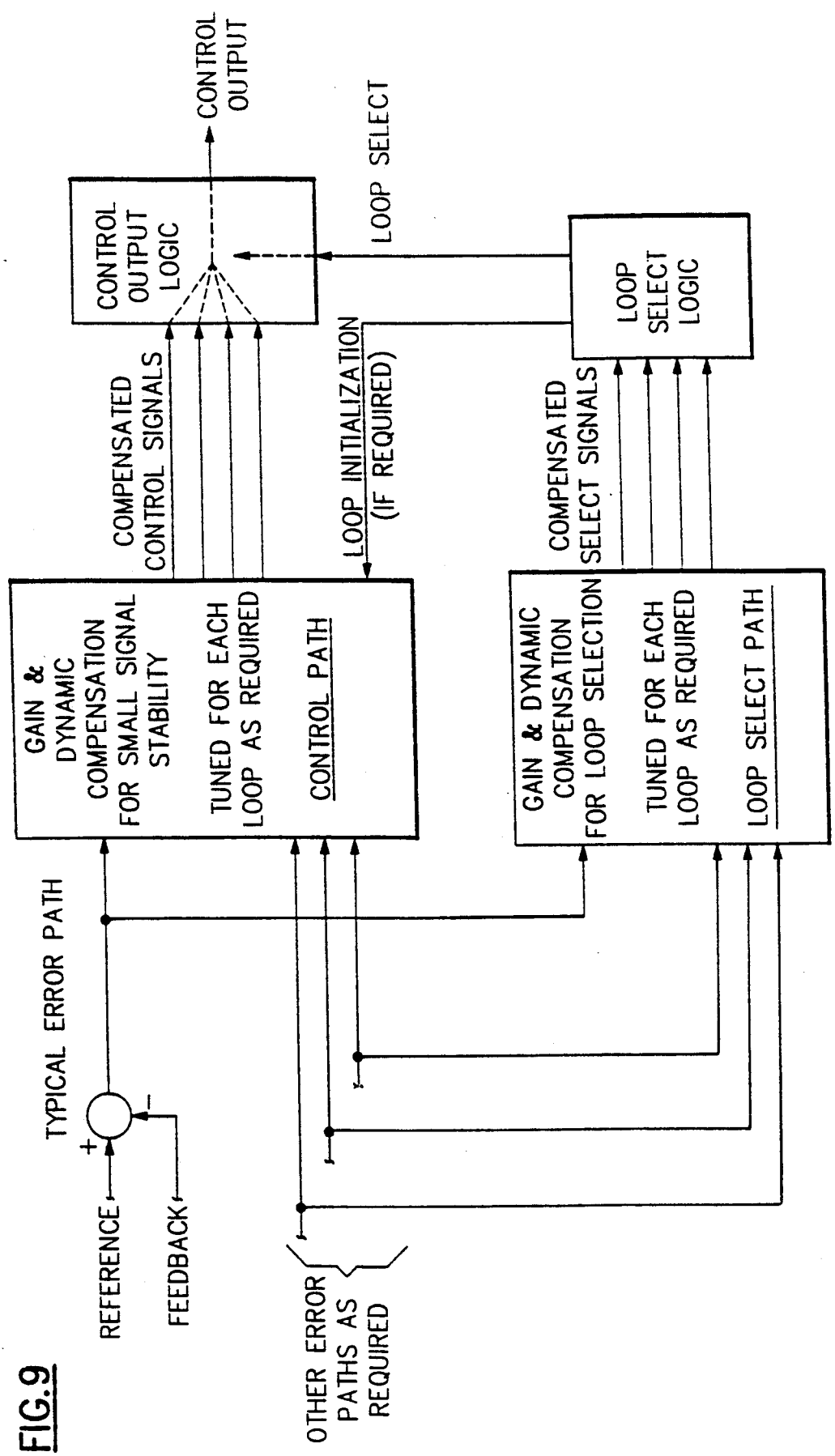
Figure 10:
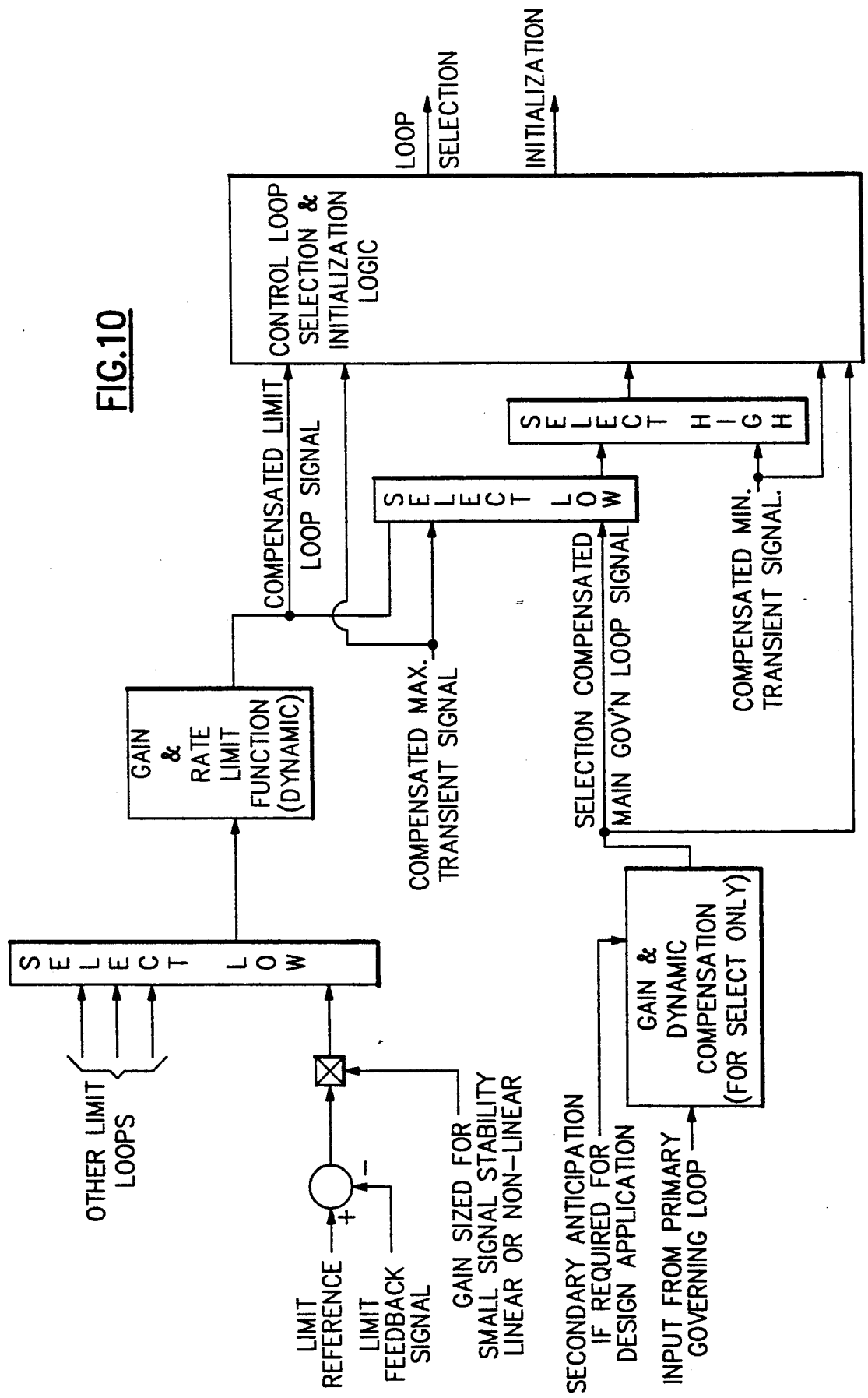

FIG. 9 is a block diagram presenting a general overview or conceptual approach of the parallel select logic with compensation used as an exemplary embodiment of the present invention; while FIG. 10 is a block diagram presenting a more particularized example of a parallel select logic with typical compensation as an exemplary detailed implementation of the decision making block of FIG. 9.

Figure 11:
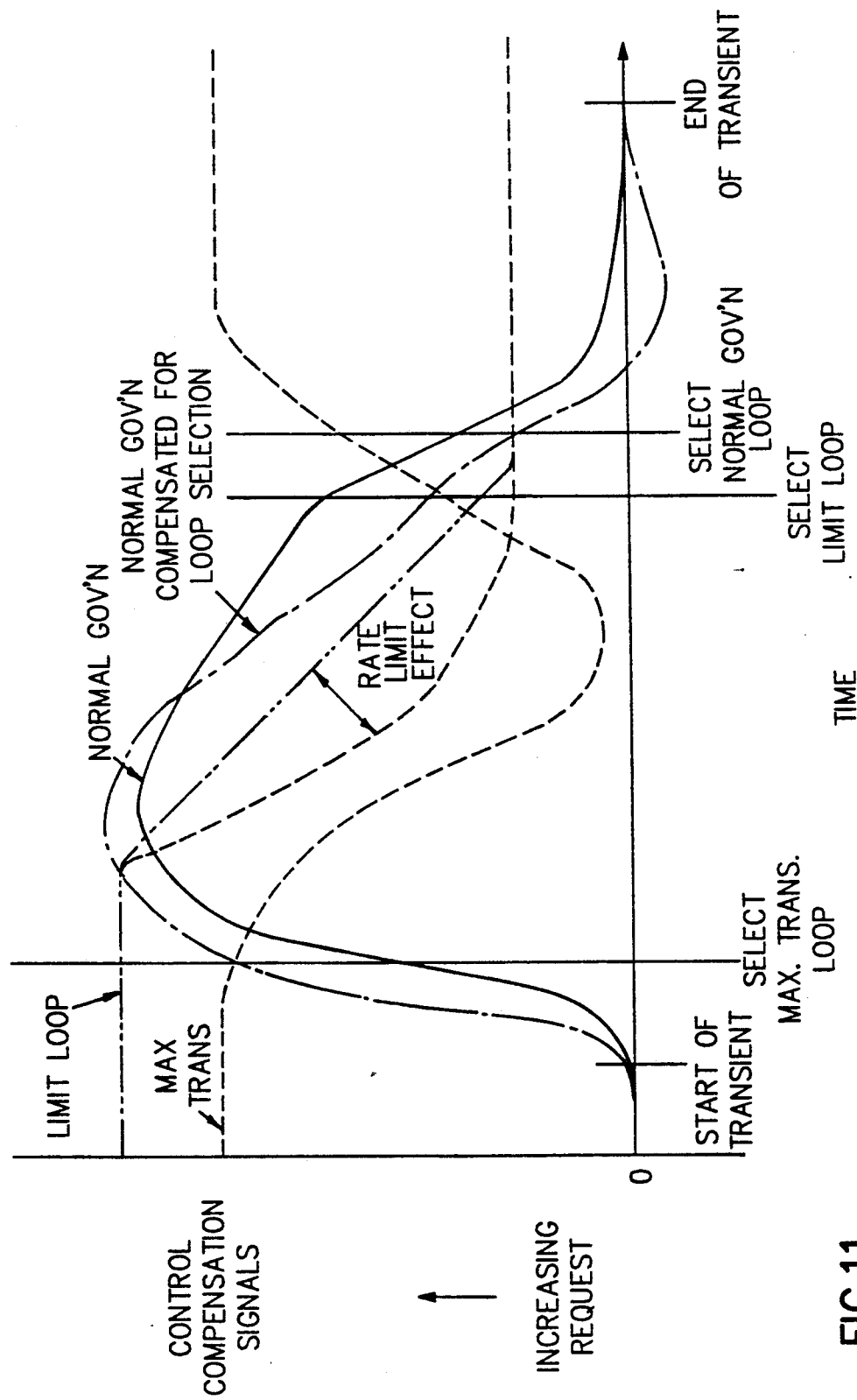

FIG. 11 is a diagrammatical graph illustrating a typical control loop response and the compensated signals for an increased "load" demand, showing the relative phasing of the signals which occur in the "Gain & Rate Limit Function (Dynamic)" block of FIG. 10 provided as an example of the transient loop process with compensated signals.

Figure 12:
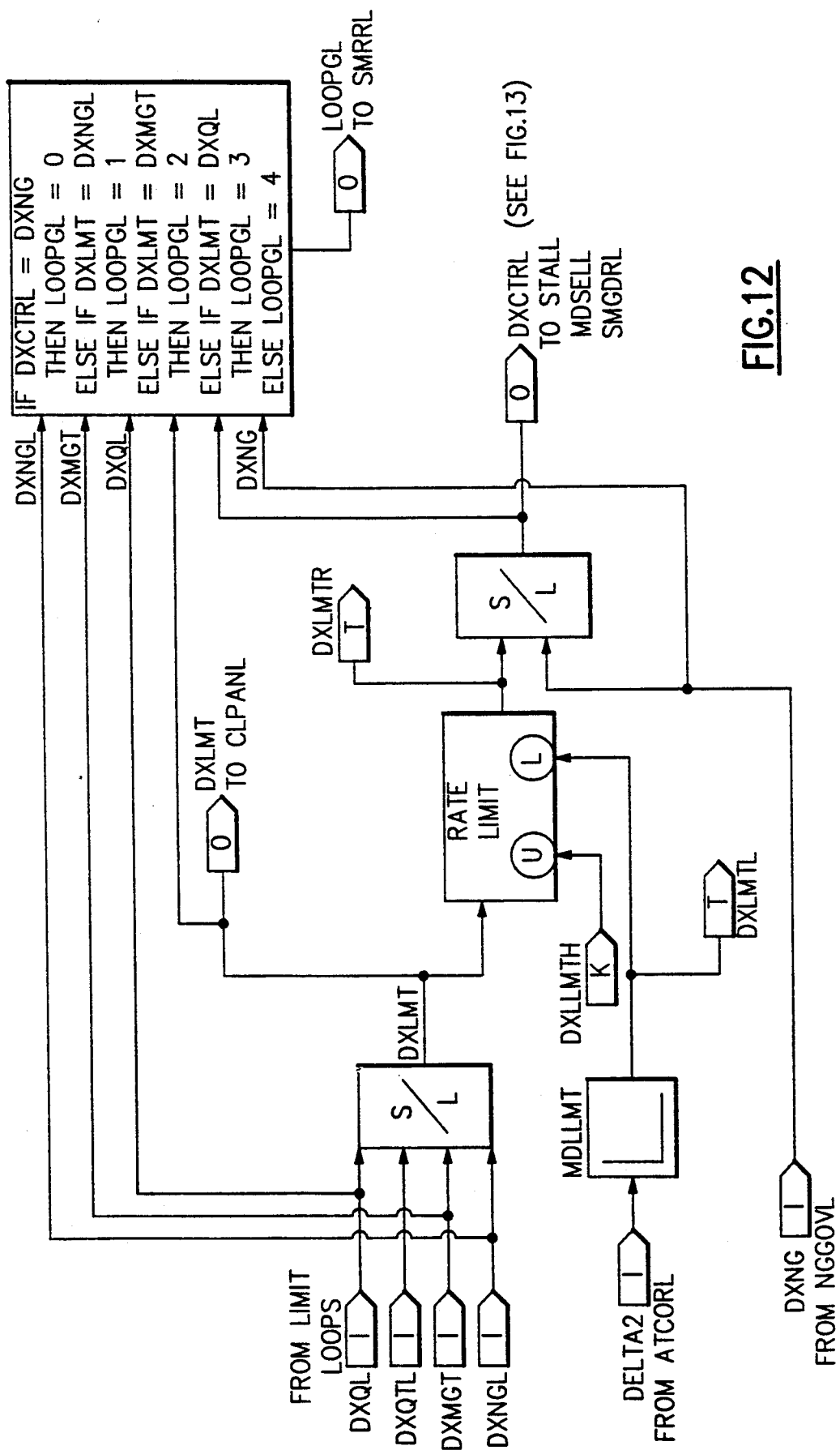
Figure 13:
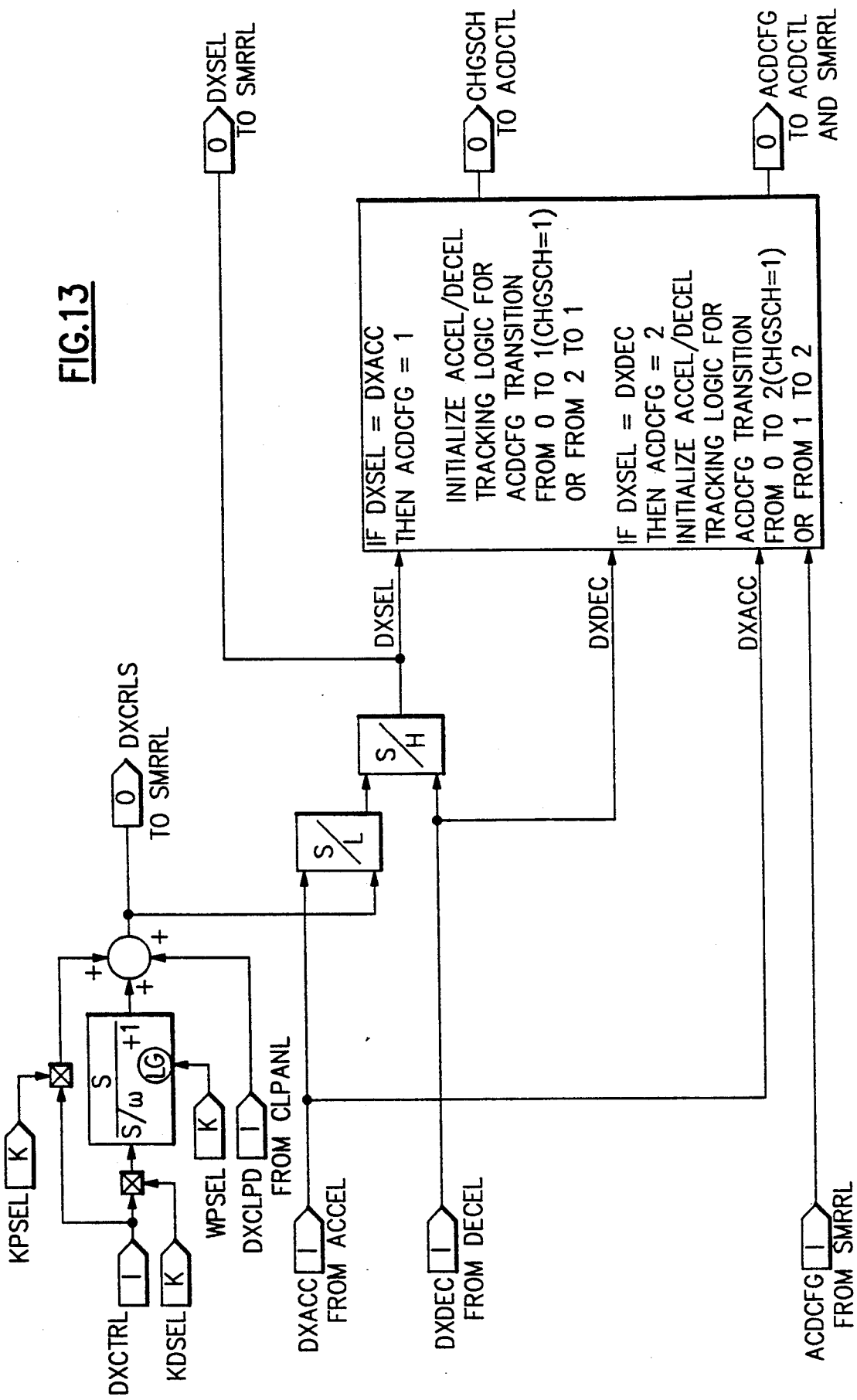

FIGS. 12 and 13 are block diagrams illustrating a detailed, exemplary embodiment of the electronic engine control (EEC) implementation of the invention.

It is noted that FIG. 12's "MIN SELECT LOGIC" (with rate limited selection) serves as part of the "front end" or input to the "MIN/MAX MODE SELECT LOGIC" of FIG. 13; while FIG. 13's "MIN/MAX MODE SELECT LOGIC" provides exemplary details for the "Loop Select Path" block of FIG. 9 and for the "Control Loop Selection & Initialization Logic" block of FIG. 10.

Figure 14:
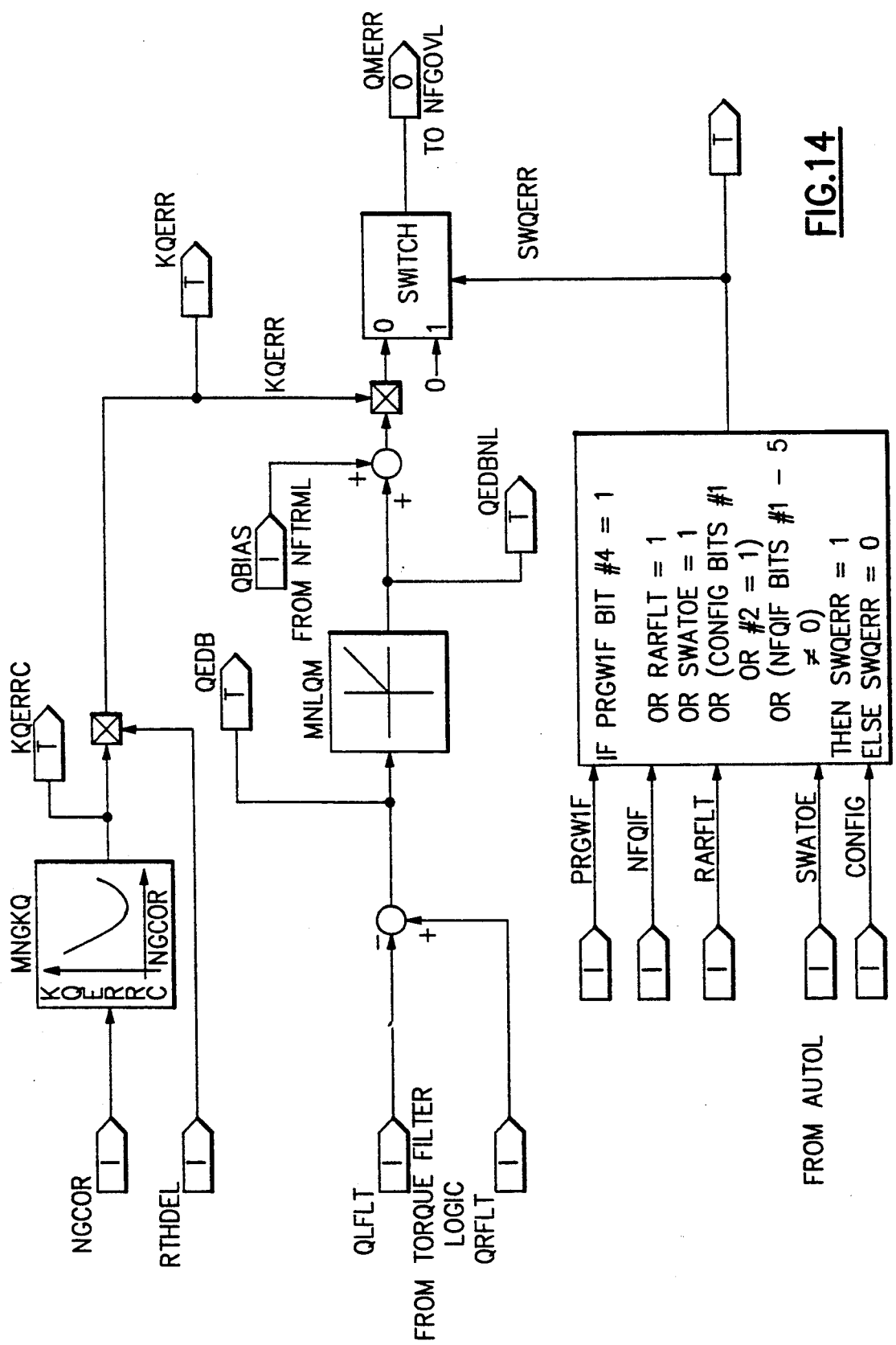

FIG. 14 is a block diagram illustrating a detailed, exemplary embodiment of the torque match logic aspect of the present invention.

Best Mode for Carrying Out the Invention

Engine & Control Overview

Figures 1, 1A:
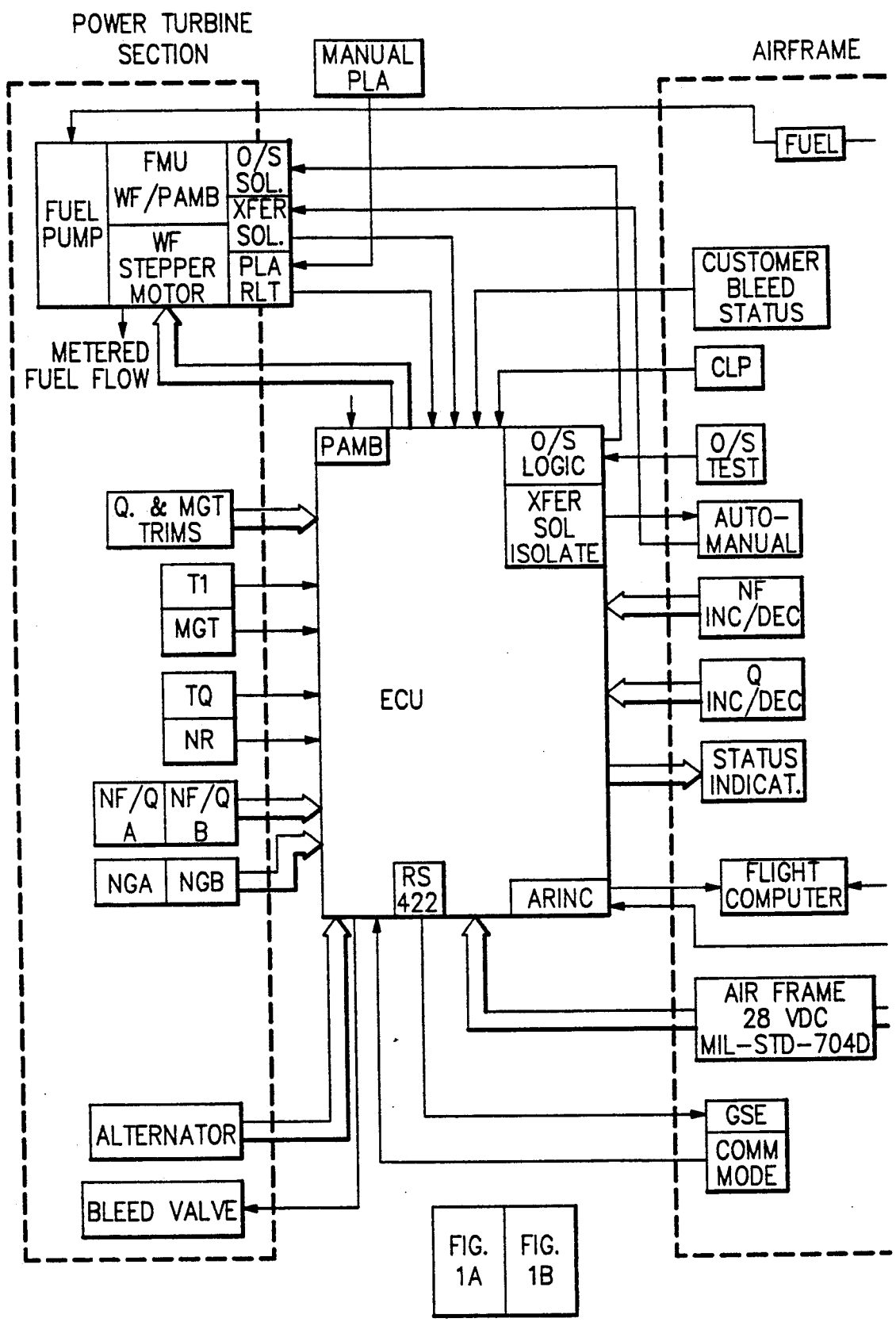
FIG. 1 (combining FIGS. 1A and 1B) is a diagram illustrating the exemplary, overall, electronic engine control (EEC) twin gas turbine unit, with twin, communicating, engine control units (ECUs), in which ECUs the exemplary embodiment(s) of the present invention are incorporated or implemented.
Figure 1B:
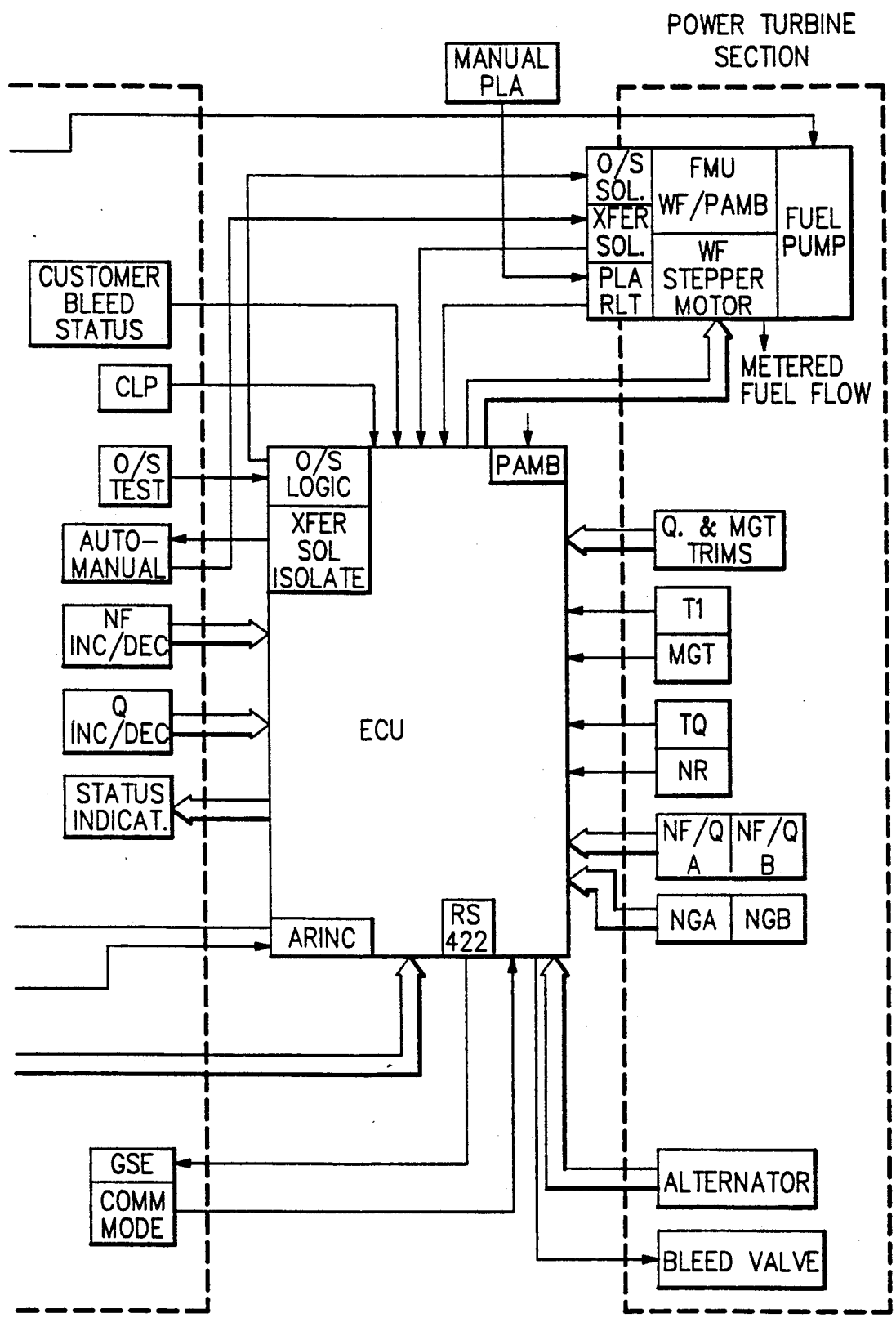

For a general background understanding of the control system aspects of the present invention, in so far as it relates to the preferred helicopter, twin gas turbine engine control art, an exemplary electronic engine control (EEC) system designed for the "Pratt & Whitney" ® Canada "PW205B" turboshaft engine is illustrated in FIG. 1. The EEC for each engine is composed of two main units, the airframe mounted, engine control unit (ECU) and the engine mounted, fuel metering unit (FMU).

The "PW205B" engine system is comprised of a pair of engine/free turbine sections coupled to a single combining gear box (not illustrated). Each free turbine section has its own accessory gear box (not illustrated), which is driven by a gas generator. A starter/generator, a dedicated alternator for the ECU, and the FMU pump are connected to the accessory gear box.

Each engine section is controlled by its own EEC. Of course, when the pertinent aspects of the present invention are applied to a single engine situation, only one EEC would be present.

As generally illustrated in FIG. 1, the ECU is a microprocessor based engine control unit, which, when combined with the FMU, performs all the functions required to provide a full authority, automatic fuel control system with manual emergency backup.

The FMU meters fuel to the engine under control of the ECU when the system is functioning normally (AUTO mode). When needed, the FMU can be controlled manually by the pilot.

To place the system in MANUAL, the pilot moves the AUTO/MANUAL switch for that power turbine section to manual. The FMU's transfer solenoid transfers fuel metering control from a stepper motor (S/M) to a flexible shaft connecting the FMU to the pilot's PLA (power lever angle) twist grip. The transition from auto to manual preferably occurs over a period of seconds in order to allow for an orderly transfer to manual control.

The ECU is powered by two sources, the airframe 28 VDC bus and the dedicated alternator. The airframe bus is used for power before the turbine section is started and during start until, for example, forty (40%) percent gas generator speed (NG) is reached. At forty (40%) percent NG speed the ECU has the required alternator-supplied power to bring the turbine to core idle speed. Above forty (40%) percent NG speed, any power interrupts to the airframe bus are transparent under normal operating conditions.

As can be seen in FIG. 1, the following are the exemplary inputs to the ECU from the engine and/or airframe:

28 VDC Airframe Power;
3 Phase Alternator Power;
Gas Generator Speeds (NGA+NGB);
Free turbine Speeds/Torque (NF/Q A+NF/Q B);
Temperature at Station 6 (T6);
Ambient Pressure ($P_{amb}$);
Inlet Temperature (T1);
Rotor Speed (NR);
Torque Temperature (TQ);
Power Lever Angle (PLA);
Collective Pitch Position (CLP);
Torque Gain Trim;
Torque Bias Trim;
MGT Trim;
NF Trim Increment Discrete;
NF Trim Decrement Discrete;
Q Increment Discrete;
Q Decrement Discrete;
Auto/Manual Select Discrete;
Overspeed Test Discrete;
Customer Bleed Status Discrete;
two (2) ARINC 429 Low Speed Serial Inputs;
RS422 9600 Baud Serial Input;
two (2) Spare Discrete Inputs; and
Communication Mode Discrete.

Likewise, as can be seen in the figures, the following are exemplary electronic outputs of each of the ECUs to the FMU and/or the Airframe:

Stepper Motor Rate Command;
System Caution Signal;
ECU Failed Signal;
Engine Flameout Signal;
Overspeed Solenoid Power and Control
Transfer Solenoid Power;
Bleed Solenoid Control;
two (2) ARINC 429 Low Speed Serial Outputs;
one (1) RS-422 9600 Baud Serial Output;
RLT Excitation; and
Resolver Excitation.

The following is a general description of the inputs and outputs to the ECUs illustrated in FIG. 1.

PLA: The aircraft power lever is connected to a Rotary Linear Transducer (RLT), which generates two voltage outputs related to the PLA twist grip angle. In AUTO mode, the position of the RLT is read as specific modes based upon the PLA position. The specific modes are Shut Off, Idle and Run.

In the MANUAL mode, the pilot must control the fuel flow using the PLA. Fuel flow between SHUT OFF and the maximum flow is adjustable using the twist grip.

CLP: The collective lever changes the pitch on the rotor blades. The angle of this lever is indicated by a resolver, which outputs a sine and cosine wave related to lever position. The CLP position is used by the ECU to anticipate load changes and compensate fuel flow accordingly.

STEPPER MOTOR (S/M): A stepper motor controlled by the ECU is located within the FMU. This motor controls fuel based upon the requirements determined by the ECU. The motor fails fixed whenever power fails or the ECU detects a major fault. WF refers to the weight fuel flow (lbs./hr.).

ROTOR SPEED (NR) SENSOR: The NR sensor consists of a tachometer generator. The frequency of the output voltage is directly proportional to drive speed. The signal is used by the EEC for the control functions.

TORQUE SHAFT TEMP. (TQ): The temperature of the torque shaft is sensed in order to allow compensation for shaft twist with respect to temperature. This temperature sensor can be, for example, a platinum Resistive Temperature Device (RTD).

TEMPERATURE AT STATION 6 (T6): The temperature of the exhaust gas, T6, is used to calculate the measured gas temperature (MGT) at the free turbine (NF) inlet, T5. The measurement device can be composed of, for example, a group of eight cromel/alumel (Cr/Al) thermocouples in parallel. The purpose of this sensor is to be able to sense and avoid excessive engine temperatures.

COLD JUNCTION COMPENSATION/INLET AIR TEMP. (T1): The temperature of the Cold Junction for T6 is exposed to inlet air. The temperature of this junction is required for two reasons:

1 the temperature of the junction between Cr/Al and copper must be known for accurate MGT sensing; and 2. the inlet air temperature is needed by the ECU for engine compensation by the control logic.

AMBIENT AIR PRESSURE ($P_{amb}$): The ambient air pressure can be sensed by, for example, a strain gauge pressure sensor within the ECU housing. The pressure is used for altitude compensation in the control.

FREE TURBINE SPEED/TORQUE (NF/Q) SENSOR: The NF/Q sensor can be, for example, a dual wound device, with input channels in the EEC designated as "NF/Q A" and "NF/Q B." The "NF/Q A" signal provides the free turbine speed and torque inputs to the EEC. The sensor can be located, for example, in the gearing between the gas generator and the rotor shaft. The system uses a torque shaft, which is made, for example, of two concentric shafts that are fixed at a single end. The Q (torque) sensor measures the offset between a reference outer shaft and a load bearing inner shaft as, for example, an eight tooth gear on each shaft passes the magnetic pickup. As will be explained more fully below, in connection with one aspect of the present invention, torque information is used by the EEC, under normal conditions, to match the torque between power sections and limit the torque available to the airframe mounted gear box. The free turbine speed (NF) can be calculated since the torque shaft is directly connected to the free turbine. The "NF/Q B" winding is used primarily for the overspeed circuit.

GAS GENERATOR SPEED (NG) SENSOR: The NG sensor contains, for example, two windings used by the ECU. These windings are designated NGA and NGB. The NGA winding is used as the primary input for the control functions. The NGB winding is used primarily for the overspeed circuit. If a failure is detected on NGA, NGB will be switched to input for both the control logic and overspeed circuit. NGA cannot replace NGB for the overspeed circuit.

STEPPER MOTOR OUTPUT: The stepper motor (S/M), located within the FMU, is driven by the ECU. The ECU provides, for example, a single, high voltage level drive to the motor. This line can be, for example, protected by a single, hardware controlled, high side switch. For processor controlled low side switches control the four phases of the stepper motor (phases A, B, C and D).

GROUND SUPPORT EQUIPMENT COMMUNICATIONS: Bi-directional RS-422 communications are provided by the ECU for use with Ground Support Equipment (GSE) for testing, maintenance and the like.

COCKPIT/INTER-ECU COMMUNICATIONS: ARINC (Aeronautical Radio Inc. standard) 429 communications is provided by the ECU for two purposes:

1. ECU bi-directional communications with the ECU associated with the other power section; and 2. uni-directional communications from the ECU to the cockpit flight computer. The cockpit communications typically provides the pilot with status information, which includes MGT, Q and Maintenance Data. In order for the two ECU's to maintain proper engine control, vital engine information is shared between engine controls. Torque information is shared with the ECU's to achieve torque matching between power sections. Each ARINC output from the ECU is error checked by a wraparound signal read by the ARINC receiver circuits. The data transmitted is tested to ensure the performance of the ARINC circuits. ARINC data is also used to compensate for sensor malfunctions.

BLEED SOLENOID CONTROL: The ECU provides a low side switch to energize an airbleed valve on the engine. The valve is opened under certain conditions to avoid engine surges. The valve is configured such that the valve will bleed air when the solenoid is energized.

AUTO/MANUAL SELECT SWITCH: The AUTO/MANUAL switch, located in the cockpit, performs two functions:

1. energizes and de-energizes the transfer solenoid in the FMU to select AUTO mode and MANUAL mode, respectively; and 2. allows selection of NF Test or NG Test during Overspeed (O/S) Test.

TRANSFER SOLENOID: The transfer solenoid is located in the FMU. Its purpose is to transfer fuel metering control from the stepper motor to the flexible cable connected to the PLA. Transfer from AUTO to MANUAL takes, for example, approximately seven seconds.

OVERSPEED CIRCUIT: The Overspeed (O/S) circuit's function is to protect the engine from any overspeed of either the gas generator or the free turbine. Under normal conditions, the turbines do not experience overspeeds. The O/S circuit is designed to operate in both the AUTO or MANUAL mode. The O/S circuit uses the NGB and "NF/Q B" windings of the speed pickups to sense turbine speeds. The speed waveforms are passed, through zero crossing detectors, into the O/S gate array (GA). This GA, powered by an independent power supply, controls the O/S solenoid high side switch and low side switch. The high side switch and low side switch controls the O/S solenoid located within the FMU. The high side and low side switch will energize the O/S solenoid within, for example, eleven (11 msec) milliseconds of an overspeed occurrence. Whenever there is an NG trip, the O/S solenoid must be cleared by toggling the O/S test switch. Whenever there is an NF trip, the O/S solenoid clears itself after NF falls below the NF hysteresis point. The O/S circuit can be tested by the pilot using the O/S test switch, the AUTO/MANUAL switch, and the PLA.

OVERSPEED SOLENOID: The O/S solenoid, located with the FMU, can bring fuel to Min Flow within, for example, approximately fifty (50 msec) milliseconds after the solenoid is energized. The return to normal flow is rate limited after the solenoid is de-energized for stall/surge avoidance.

MEMORY: The ECU can contain, for example, three types of memory for three different purposes:
1. RAM (E.g. 2 K×16 Bits): For scratchpad use.
2. EEPROM (E.g. 512×8 Bits): For fault storage, maintenance information, and data logging. A selected amount, for example, 256 * 8 bits can be write protected for date storage.
3. UVPROM or EEPROM (E.g. 16 K×16 Bits with Hardware Write Protection): for program memory.

Model of NG/NG Governing Loop

The NF/NG governing mode is the primary form of control operation for hover, level flight and gentle maneuvers. The logic for the NF/NG governing mode of the present invention is shown in FIGS. 2 and 6.

Figures 2, 2A:
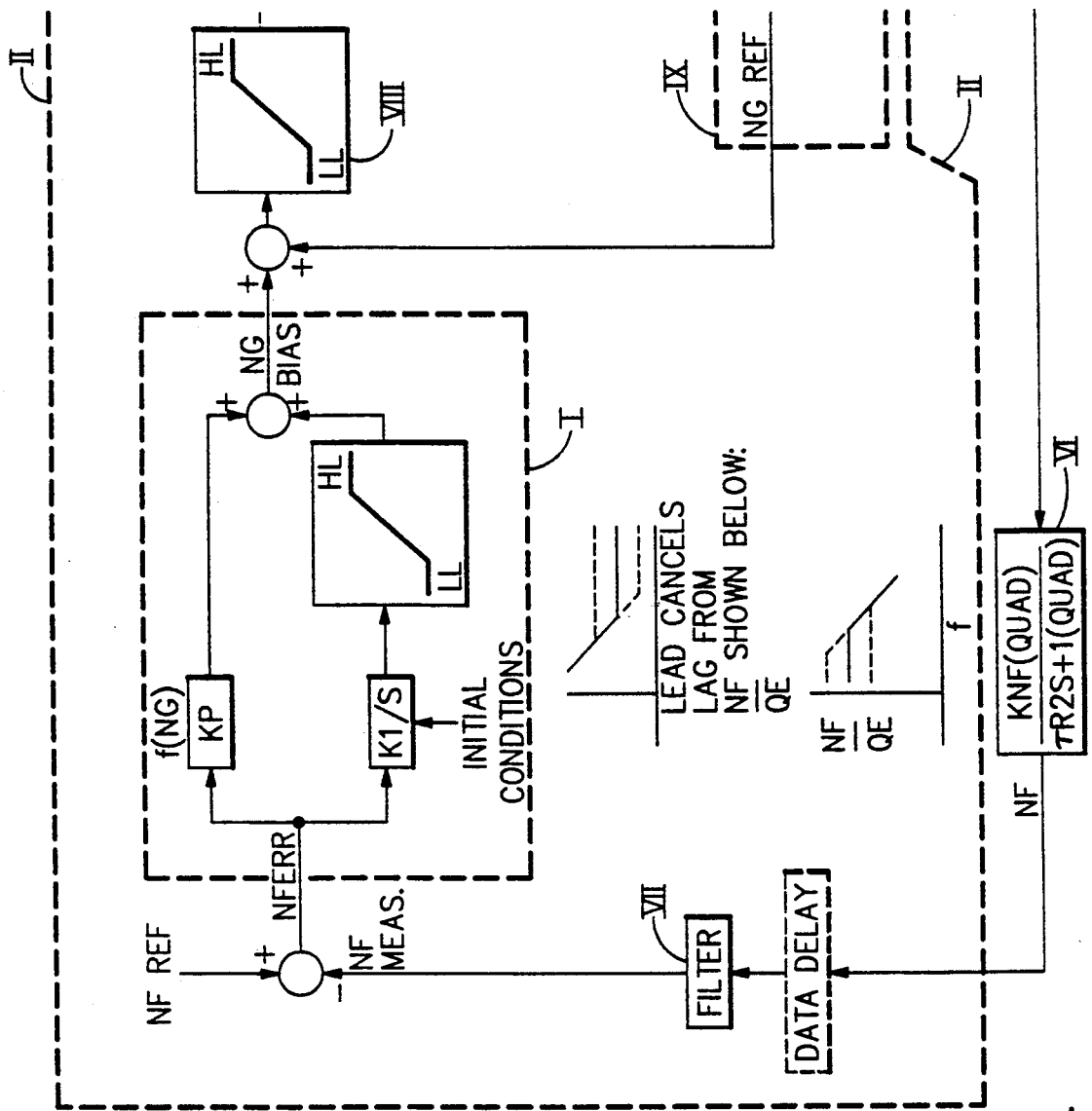
FIG. 2 (combining FIGS. 2A and 2B) is a block diagram of a generalized over-view of an exemplary model of the "NG/NF" (gas generator loop speed & turbine speed) governing architecture for the present invention.
Figure 2B:
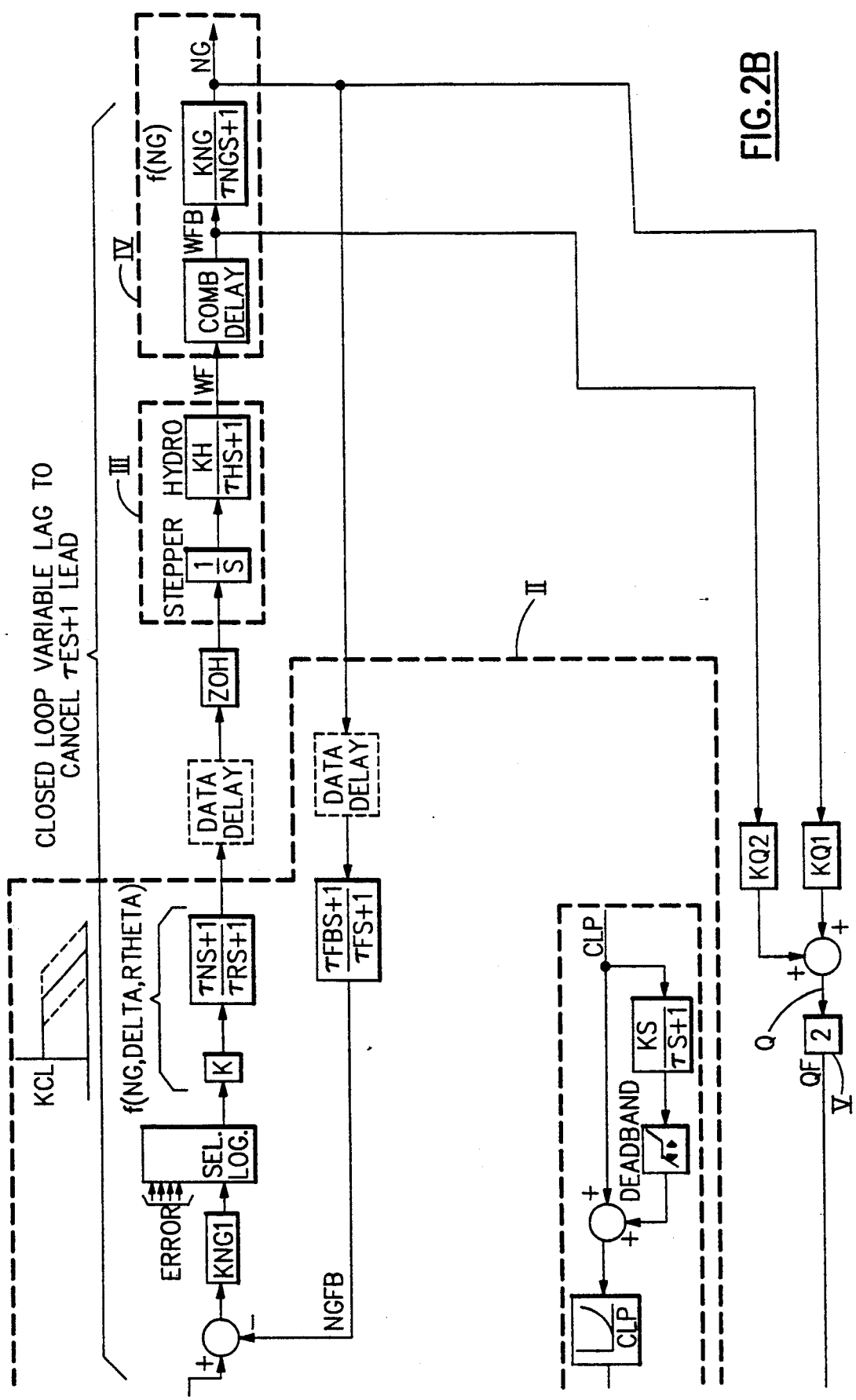

In FIG. 2 a high level, overview of the "NG/NF" governing loop is provided in generalized or conceptual block diagram form using a "hardware embodiment" software model. In it the NF REF is fed into a proportional KP plus integral KI (P+I) section I located in the upper, left hand portion of the figure. Software implementation is indicated by the dashed section II.

The FMU is modeled in section III, while one engine is modeled in section IV. The second engine is included in the model at box V, into which is fed the output torque (Q). A simplified mathematical model of the rotor system is included in section VI, which includes the following mathematical expression:

$$\frac{K_{NF} \cdot (QUAD)}{(\tau_{R2}S + 1)(QUAD)}$$

where "K" indicates gain, "$\tau$" is a time constant, "S" indicates a LaPlace transform, and "(QUAD)" represents a quadratic function.

The "FILTER" box VII includes or represents one of the innovative aspects of the present invention shown in greater detail in connection with FIG. 6 (discussed below). The steady state governing path of FIG. 5 is represented by box VIII, while the "Steady State Gov'n Reference and Anticipation (As Required)" block of FIG. 5 is modeled in section IX (all as discussed below).

The gas generator (NG) speed reference set-point is determined by the collective pitch (CLP) lever position and a bias, which is a function of filtered free turbine (NF) speed and engine torque (Q). The NG reference is compared to sensed NG speed from the engine, and a stepper motor (S/M) rate request is generated.

If this is the minimum rate request for the S/M, it is preferably compensated for a stable loop crossover point and sent to the stepper motor output logic, the details of which are not a part of the present invention. A S/M rate request as a function of the rate of change of CLP is added at this point, to anticipate rapid load changes on the engine. The NF/NG governing logic S/M rate request preferably is preempted during hard transients (accels. and deccels.) and power excursions that approach the engine limits (e.g., NG limit, MGT limit, local and total Q limits).

All of the above mentioned control loops are compensated for variations in atmospheric temperature and pressure.

Increased Bandwidth Robustness

A block diagram including the "increased bandwidth robustness" aspect of the present invention is shown in FIG. 3. It is noted that $G_5$ and $H_5$ are generalized terms defining terms in a mathematical function, where $G_5$ is the forward path term and $H_5$ is the feedback term.

The five basic components of the control system, as shown in FIG. 3, are listed below;
1) Gas Generator Speed (NG) Closed Loop—NG/NGREF;
2) Gas Generator Speed (NG) to Engine Output Torque (QF)—QF/NG;
3) Output Torque (QF) to Free Turbine Speed (NF) Rotor System—NF/QF;
4) NF Loop Feedback Compensation; and
5) NF Loop Forward Path Compensation.

The frequency response of the NG Closed Loop transfer function resembles that of a high order, low pass system. The frequency response of the QF/NG transfer function resembles that of a first (1st) order high pass system.

The lag term in the NG/NGREF transfer function is designed to cancel the QF/NG lead term over the operating profile. The lag term in the NG/NGREF transfer function has a variable bandwidth achieved by varying the forward path gain of the NG loop to match, for example, the three (3 db) decibel point of the bandwidth with the break frequency of the variable QF/NG lead term.

This provides effectively a flat response in frequency out to the exemplary three (3 db) decibel point of the NG closed loop and reduces phase lag at low frequencies.

The rotor system dynamics are made up of two major components - the dominant rotor lag and the rotor resonance. The positive peak magnitude of the resonance is primarily compensated for by a "double notch" filter in the feedback compensation.

This filter provides robust compensation of the resonance, using a unique design which combines two (2) bi-quad notch style filters located close enough to provide a steep magnitude attenuation and a wide stopband centered at the peak of the resonance. The filter stopband is wide enough to provide, for example, for a plus or minus ten (±10%) percent variation in resonance frequency without having to dynamically modify filter coefficients. Similarly, the filter provides adequate attenuation [for example, twenty six (26 db) decibels] in the stop band.

A mathematical example in LaPlace domain (frequency domain rather than time) of the "double notch" filter of FIG. 3 is presented below.

$$\frac{\frac{S^2}{W_{n1}^2} + \frac{2Z_1 S}{W_{n1}} + 1}{\frac{S^2}{W_{n1}^2} + \frac{2Z_2 S}{W_{n1}} + 1} \times \frac{\frac{S^2}{W_{n2}^2} + \frac{2Z_1 S}{W_{n2}} + 1}{\frac{S^2}{W_{n2}^2} + \frac{2Z_2 S}{W_{n2}} + 1}$$

where
$W_{n1}$ = Resonance freq. −10% (minus ten percent)
$W_{n2}$ = Resonance freq. +10% (plus ten percent)

and for the dampening ratios (Zeta) -

$Z_1 = 0.063$ $Z_2 = 0.5$ and "S" is a LaPlace transformation. Of course these are merely exemplary values and are very much application dependent.

The lag/lead portion of the feedback compensation provides an additional, for example, two-to-one (2:1) magnitude attenuation of the resonance frequency, while only reflecting a small amount of phase back to the open loop crossover of the NF loop. This is accomplished by choosing the lag break frequency to be a factor of, for example, two (2) below the lead break, and a factor of, for example, three (3) minimum above the loop crossover, while assuring the lead break occurs before the resonance.

The NF loop forward path compensation sizes the open loop crossover by compensating for variations in the DC gain of the QF/NG lead and the dominant rotor lag. The compensation uses a proportional plus integral (P+I) type configuration, giving a transfer function of a lead over a free integrator with a magnitude shift gain multiplier ("effective" integral gain) comprising an actural integral gain and a contributing (proportional) gain. This gain preferably is sized nominally to set the open loop crossover frequency, and then is varied to cancel changes in the DC gain of both the the dominant rotor lag over the operating profile.

The lead break frequency is also varied as the effective integral gain is varied and is sized to match the variation in break frequency of the dominant rotor lag. This variation is done primarily to reduce phase fluctuations and so is not required for maintaining a constant crossover frequency at low frequencies.

The proportional-plus-integral (P+I) compensation is configured to improve performance in spite of external disturbances like, for example, aerodynamic loading, and also allow gain shifting without modifying the integral gain. It is configured in a derivative-lag plus proportional quantity in series with an integrator.

A block diagram with a related mathematical expression of an exemplary implementation is shown in FIG. 4, wherein:

$\tau_D$ is a time constant for the derivative path;

W is the operating frequency or expected range of operating frequencies;

S is a LaPlace transform representation;

$K_D$ is the derivative path gain;

$K_S$ is a contributing (proportional) gain; and $K_I$ is the integrator gain of FIG. 2.

As can be seen in the figure, the derivative provides rate of change detection, which helps to turn the integrator around faster. Also, this configuration allows the gain shift to be performed by the gain contributing to integral control ($K_S$) as opposed to the generalized integral gain $K_I$. Thus the integral gain $K_I$ can remain fixed, which improves integrator performance.

As is know to the art, there are many ways of implementing this improved integral-plus-proportional (P+I) compensation.

Multi-Loop Control of Single Function

FIG. 5 presents a conceptual overview of the preferred, exemplary "multi-loop control of a single function" embodiment of the invention, while FIG. 6 provides a more detailed representation thereof, particularly of the "steady state governing path compensation" block of the former. As can be seen, the block diagram of FIG. 6 provides the information for the detailed architecture to accomplish the functions of the "I + As Required" compensation block of FIG. 5.

As should be understood, superior transient control is achieved by the use of a multi-loop speed governing design of the invention. Normal speed governing typically involves a proportion and integral (P+I) approach, when the NF loop is commanding fuel flow. When direct NF control is overridden by another loop [e.g., acceleration (accel.), deceleration (decel.)]via the select logic, the NF error is operated upon by the proportional-plus-differential (P+D) compensation.

The P+D and P+I compensation values can be tuned separately to provide superior control in different portions of the transient control envelope. The P+D loop is significantly higher in gain than the steady state governing loop to provide superior anticipation to load changes and expand the transient governing envelope.

A true "bumpless" or smoothly continuous, inner loop reference is maintained when loop switching occurs by a combination of integrator re-initialization and freezing. When transferring off the steady state governing loop, the integrator is re-initialized and frozen to maintain the inner loop reference, aiding in inner loop performance. The P+D loop bias, in combination with the current integral reset and the current inner loop reference provide the intelligence for the integrator re-initialization. Upon transferring to the steady state governing loop, the integrator is reinitialized using the inner loop reference, comprising the P+D output and the as a "predictor" for the integrator reset.

FIGS. 7 and 8 provide a detailed, exemplary implementation of the "Compensation Select and Integrator Initialization Logic" block of FIG. 5 for the NF governing logic, with FIG. 8 further providing detailed, exemplary logic for the "SWNFI Switch Logic" and "NF Integrator Initialization Logic" blocks of FIG. 7.

Pseudo-transient torque matching is a secondary benefit of the multi-loop single integrator implementation of the invention. The re-initialization and freezing of the integrator upon loop transfer thereby holds any speed reset and torque match reset.

The speed loop bias is basically a proportional (P) control around the reset held by the integrator (I). This would imply proportional (P) control of output torque, and, if the torques are matched prior to the transient, they will remain well matched through the transient. It should be noted that the torque gains are fairly constant about a given operating point.

The invention's torque matching will be discussed further below.

For a more complete understanding of FIGS. 7 and 8 (as well as FIG. 14, etc.), the nomenclature for the indicated signals with exemplary values is set out in the following software table, in which:

AC = arithmetic constant;

AN = analog;

BD = boolean discrete;

IF = interface;

MD = multi-state discrete;

SD = software discrete; and

TP = table polynomial.

Although implemented in digital form, as detailed below, it is possible to implement the system in analog form, although such would likely be much more complex and expensive.

| | |
|---|---|
| ATODNG | AN |

MIN VALUE: 0      MAX VALUE: 200      UNITS: %NG
Autorotation Recovery NG Rate Request
Scaled On: 256
CLPDEF          BD
BOOLEAN VALUE BEING DESCRIBED = 1
CLP Default Flag. A true value indicates the that CLP
  interface is using a default value.
CONFIG          SD
Local EEC Configuration Word. Configures Local EEC
  Control Laws.
DISC2           SD
Discrete 2
KAUTO           AC
VALUE: 0.171
Autorotation gain.
KNFEC           AN
MIN VALUE: 1    MAX VALUE: 4        UNITS: %NG/
                                          %NF
Output of map MKFENG in NF governing logic. KNFEC is
  the corrected NF speed error gain.
Scaled on: 4
KPNFC           AN
MIN VALUE: .05  MAX VALUE: 1        UNITS: %NF/
                                          %NF
Output of map MKPFNG in NF governing logic. KPNFC is
  the corrected proportional gain and feedback gain
  for integrator.
Scaled on: 1
KPNFT           AN
MIN VALUE: .125 MAX VALUE: .5       UNITS: %NG/
                                          %NF
Uncorrected NF transient loop gain compensation.
Scaled on: 1.0
KNFI            AC
VALUE: 1.32                         UNITS: %NG/
                                          S/%NG
Gain for integrator in NF governing logic.
KPNFTS          AC
VALUE: 7.0                          UNITS: %NF/
                                          %NF
NF proportional loop gain for transient off-loop
  performance.
KSINGL          AC
VALUE: 1.52                         UNITS: %NF/
                                          %NG
NF Governing loop gain compensation for single engine
  operation.
LOOP            MD
Variable indicating which loop has been selected for
  control. From Stepper Motor Rate Request logic.
        0   SYST NAME:
            Governor Loop
        1   SYST NAME
            NA Limit Loop
        2   SYST NAME:
            MGT Limit Loop
        3   SYST NAME:
            Local Torque Limit Loop
        4   SYST NAME:
            Total Torque Limit Loop
        5   SYST NAME:
            Accel Loop
        6   SYST NAME:
            Decel Loop
MKFENG          TP
Table lookup for conversion from NGCOR to KNFEC in NF
  governing logic. KNFEC is the corrected NF error
  path gain.
MKPFNG          TP
Table lookup for conversion from NGCOR to KPNFC.
  KPNFC is the corrected proportional gain in the NF
  loop.
MKPNFT          TP
Table lookup for conversion from NGCOR to KPNFT in NF
  governing logic. KPNFT is the uncorrected NF
  transient loop gain compensation.
MFDV            AN
MIN VALUE: −32  MAX VALUE: 32       UNITS: %NF
Output of derivative-lag in NF governing logic.
Scaled on: 64
NFERR           AN
MIN VALUE: −32  MAX VALUE: 32       UNITS: %NF
NF error signal. The difference between NFREF and
  NFFBFL minus NFRUPR.
Scaled on: 32
NFERR2          AN
MIN VALUE: −32  MAX VALUE: 32       UNITS: %NF
NF error signal after proportional plus derivative
  compensation.
Scaled on: 64
NFERR3          AN
MIN VALUE: −64  MAX VALUE: 64       UNITS: %NF
Derivative plus proportional response from NF
  transient loop, uncompensated for altitude and gas
  generator speed.
Scaled on: 64
NFFBFL          AN
MIN VALUE: 10   MAX VALUE: 127      UNITS: %NF
NF filtered feedback signal.
Scaled on: 128
NFFLT           AN
MIN VALUE: 10   MAX VALUE: 127      UNITS: %NF
NF speed input with notch filter applied.
Scaled on: 128
NFIHL           AC
VALUE: 30                           UNITS: %NG
NF integrator high limit.
NFIIC           AC
MIN VALUE: −30  MAX VALUE: 30       UNITS: %NG
NF governing integrator initial conditions. Denotes
  value to which the integrator's output and past
  value are to be set in software. Integrator is to
  be reset with NFIIC only when any one of the
  conditions for calculating NFIIC is satisfied.
Scaled on: 128
NFILL           AC
VALUE: −30                          UNITS: %NG
NF integrator low limits.
NFINFG          BD
BOOLEAN VALUE BEING DESCRIBED = 1
Run-up logic NF loop integrator bypass switch. A true
  value disables NF loop integrator operation during
  engine run-up.
NFNGBS          AN
MIN VALUE: −100 MAX VALUE: 100      UNITS: %NG
Bias to NG reference due to NF error contribution.
Scaled on: 256
NFNGKP          AN
MIN VALUE: −100 MAX VALUE: 100      UNITS: %NG
NF proportional governing part of the NG reference.
Scaled on: 128
NFNGTS          AN
MIN VALUE: −127 MAX VALUE: 128      UNITS: %NG
NF proportional control output bias.
Scaled on: 128
NFKPKD          AN
MIN VALUE: −256 MAX VALUE: 256      UNITS: %NG
Incremental step increase for NF integrator, less the
  contribution from the torque matching logic.
Scaled on: 256
NFPRD3          AN
MIN VALUE: −500 MAX VALUE: 500      UNITS: %NF
NF governing logic proportional path value.
  Represents integral path contribution to NG
  reference.
NFREF           AN
MIN VALUE: 95   MAX VALUE: 103      UNITS: %NF
Reference speed for the NF governing loop. From NF
  reference and torque bias logic.
Scaled on: 128
NFRUPR          AN
MIN VALUE: 0    MAX VALUE: 127      UNITS: %NF
Run-up logic NF reference trim value.
Scaled on: 128
NFSM3           AN
MIN VALUE: −500 MAX VALUE: 500      UNITS: %NG
NF governing loop integrator input after switch.
Scaled on: 512
NFSUM3          AN
MIN VALUE: −500 MAX VALUE: 500      UNITS: %NG
NF governing loop integrator input value before SWNFI
  switch.
Scaled on: 512
NGCLPR          AN -continued MIN VALUE: 63.64   MAX VALUE: 127   UNITS: %NG
NG reference from CLP reference logic.
Scaled on: 128
NGCOR     AN
MIN VALUE: 6.306   MAX VALUE: 145.977   UNITS: %NG
Lag filtered NG with temperature correction applied.
Scaled on: 256
NGGOR     AN
MIN VALUE: 6.306   MAX VALUE: 145.977   UNITS: %NG
Lag filtered NG with Temperature Correction Applied.
Scaled on: 256
NGREF     AN
MIN VALUE: 10    MAX VALUE: 127   UNITS: %NG
Test point output of range limiter in NG governing
  logic. NG reference value.
Scaled on: 128
NGRNF     AN
MIN VALUE: −30   MAX VALUE: 127   UNITS: %NG
Component of the NG reference generated by the NF loop
  error path.
Scaled on: 128
NGRNFB    AN
MIN VALUE: −100  MAX VALUE: 100   UNITS: %NG
Summation of NF governing integrator biased with NF
  proportional path.
Scaled on: 128
NGRNFI    AN
MIN VALUE: −30   MAX VALUE: 30    UNITS: %NG
Output of NF governing integrator.
Scaled on: 128
QMERR     AN
MIN VALUE: −20   MAX VALUE: 20    UNITS: %NG
Torque match error calculated in torque match logic.
Scaled on: 256
RTHDEL    AN
MIN VALUE: .834  MAX VALUE: 2.0   UNITS:
                                  (UNITLESS)
Quotient of RTHETA divided by DELTA2.
UNITS:SQRT(K/K)/PSIA/PSIA)
Scaled on: 2.0
  where -
DELTA2    AN
MIN VALUE: .242  MAX VALUE: 1.22  UNITS:
                                  PSIA/PSIA
Inlet pressure correction factor for engine
  parameters.
Scaled on: 2
  and
RTHETA    AN
MIN VALUE: .870  MAX VALUE: 1.11  UNITS:
                                  SQRT(K/K)
Inlet temperature correction factor for engine
  parameters.
Scaled on: 2
SWATOE    BD
BOOLEAN VALUE BEING DESCRIBED = 1
Switch indicating sensed autorotation entry. From
  autorotation logic.
SWNFGN    BD
BOOLEAN VALUE BEING DESCRIBED = 1
Switch to control NF loop gain for single and dual
  engine operation. A true value indicates single
  engine operation.
SWNFI     BD
BOOLEAN VALUE BEING DESCRIBED = 1
Switch discrete for bypassing the NF loop integrator.
  A true value sets the switch to close the loop.
WPNFED    AC
VALUE: 40   UNITS: RAD/SEC
Break frequency of derivative-lag in NF governing
  logic.

As can be seen in FIGS. 7 and 8, the logic generates one component of the reference for the inner NG control loop. The filtered NF speed signal (NFFBFL) is subtracted from the NF speed reference (NFREF). An additional term (NFRUPR) is subtracted from the result as part of the engine control during run-up.

The resulting signal (NFERR) is then sent in three directions—a proportional-plus-integral (P+I) path for normal isochronous operation, a proportional-plus-differential (P+D) path for transient excursions from rotor governing (accel., decel., and limiter loops), and out of this module to a proportional-plus-lag path. This last path is used when the remote EEC signals the local EEC that the remote EEC has lost either its incoming torque signal or its ARINC communication input.

The first two paths are described in greater detail as follows.

P+I: The signal NFERR is fed through a proportional-plus-derivative path. The proportional path gain is a function of corrected gas generator speed and is corrected for altitude effects.

The gain map output KPNFC is the uncorrected effective integral gain and is varied to compensate for the change in the dc gain of the rotor system and the rotor time constant both, which change as a function of NG speed. The resulting proportional-plus-derivative sum is altitude corrected in the derivative path (uncorrected in the proportional path). The result is then multiplied by KNFEC, which compensates for the change in steady state gain of the NG-to-QF engine lead, which changes as a function of NG.

This signal is multiplied by a gain to compensate for single or dual engine operation, and then by a second gain adjustment used when the rotor system is uncoupled from the engine in autorotation. This new signal NFKPKD is summed with QMERR, the contribution from the torque matching logic, which together produce NFSUM3.

In normal rotor governing this signal is fed to the NF loop integrator and is biased by ATODNG from the autorotation detection and recovery logic before being used as the NF error component of the NG reference. The NF integrator is re-initialized for several special conditions (see FIG. 8).

P+D: For the proportional-plus-derivative path the signal NFERR is fed through a fixed proportional gain and summed with the derivative of NFERR, producing NFERR3. This is multiplied by an altitude-corrected gain that compensates for the shift in the NF-to-QF engine lead, which changes as a function of NG. When this loop is operating (SWNFI=True), this signal is biased by the NF integrator offset and again biased by ATODNG (see above) for autorotation effects.

The module output NGRNF is set to zero (0) during engine run-up to one hundred (100%) percent NR (NFINFG=1).

Parallel Select Logic with Dynamic Compensation

FIG. 9 presents a general overview or conceptual approach of the parallel select logic with compensation used as an exemplary embodiment of the present invention; while FIG. 10 presents a more particularized example of a parallel select logic with typical compensation as an exemplary detailed implementation of the decision making block of FIG. 9.

As can be seen, independent select and control paths allow the system designer to optimize the loop selection process independently of the various control loop dynamics. Current systems, using typical select high/low processes, generally make compromises in stability gains in order to aid in proper loop selection. The gain compromises significantly affect the controls performance characteristics in both frequency and time domain (e.g., cut back, overshoot) performance.

Independent dynamic compensation added to the loop selection process allows for the optimization of loop selection in terms of loop switching (note FIG. 9).

This technique allows the system to compensate for the differences in control loop responses. An example in the helicopter art that the bandwidth of temperature control loops is significantly less than the torque control loop.

FIG. 11 presents in diagrammatical form the typical loop and resulting compensated signals for an increased "load" demand, showing the relative phasing of the signals, which occur in the "Gain & Rate Limit Function (Dynamic)" block of FIG. 10. Noted in FIG. 11, as an example of the transient loop selection process with compensated signals, are the various types of compensation to dynamically shift the loop selection points. Note particularly the "Normal Gov'n Compensated for Loop Selection" signal, resulting from the "Normal Gov." signal with the effects of the "Rate Limit Effect". Of course, the types of compensations can be varied depending upon the desired response.

As should be understood, the dynamic compensation of the invention provides a method of anticipation to the control system limitations, thereby increasing the available dynamic envelope in the time domain, i.e., superior use of the control authority envelope.

The rate limit feature, added to the limit loops, provides a method for control of the rate of approach to the limits built into the control system. As noted above, this technique eliminates a number of problems currently encountered in present control selection processes (e.g., overshoot/ring or early cut back). For example, a "stiff" rate limit will delay selection of the limit function, allowing an overshoot of the limiter, when used in conjunction with the gain function to also reduce the system "ring" or "hard cut back" due to hitting the loop hard. This rate limit technique allows maximum use of available plant performance.

FIGS. 12 and 13 illustrate a detailed, exemplary embodiment of the electronic engine control (EEC) implementation of the invention. It is noted that the "S/L" blocks of FIG. 12 stand for "select/low." As can be seen the detailed logic block at the upper left of the figure includes five exemplary loops DXNGL, DXMGT, DXQL, DXLMT & DXNG.

FIG. 12's "MIN SELECT LOGIC" (with rate limited selection) serves as part of the "front end" or input at DXCTRL to the "MIN/MAX MODE SELECT LOGIC" of FIG. 13. FIG 13's "MIN/MAX MODE SELECT LOGIC" provides exemplary details for the "Loop Select Path" block of FIG. 9 and for the "Control Loop Selection & Initialization Logic" block of FIG. 10.

This logic setup has been incorporated in a helicopter engine and flight tested and proven to significantly increase system performance.

Torque Loop Limitation Based on Speed Loop Gains

As noted above, prior art torque matching algorithms provide a path for significant speed excursions in the event of a failure, (e.g., incorrect bias, counter problems, "fail fix" on one engine, etc.). To limit this problem, the general prior art practice is to severely limit the torque matching gain, and therefore the effectiveness of the control loop. The torque matching bias and the speed loop bias both contribute to the inner loop reference. The "Torque Matching Loop" of the present invention resolves this prior art problem.

As noted above, the torque matching problem of the prior art arises when the error in the torque match loop cannot be closes (this problem can have many causes), and the difference causes a constant bias to the speed governing loop. In this case the speed loop is required to correct for this torque match error, causing an error proportional to the relative gains of the speed and torque governing loops and opposite in sign. This problem is compounded in isochronous controls, as used in the exemplary electronic engine control design to which the present invention is preferably applied, because a steady state error can interate to the extremes of the integrator limits.

The "Torque Matching Loop" portion (upper/left) of FIG. 6 presents an overview of the torque loop limiting logic of the present invention; while FIG. 6 overall presents an overview of the electronic engine control design showing the speed and torque loop interactions. The "Torque Match Logic" of the "Torque Matching Loop" portion (upper/left) of FIG. 6 is further illustrated in detail in FIG. 14 and provides a method of maintaining the torque loop bandwidth and limiting the speed excursion incurred in event of a failure.

A key part of the logic package is the absolute torque match bias limit as a direct function of the speed loop gains illustrated in FIG. 14.

By using a predetermined speed error, defined as acceptable in event of a failure, and the speed governing loop gains, a limit can be calculated and applied to "limit" the bias of the torque matching loop. The limit is also dynamic in nature, as the gains of the speed loop are variable with power level. The variable limit on torque bias then implies that the speed loop excursion is always a constant (in event of a failure).

As noted, FIG. 6 in its overall view illustrates this technique as implemented in the exemplary electronic engine control (EEC) application. This logic package has been proven very successful during actual engine tests.

Having thus described at least one exemplary embodiment of the invention, that which is new and desired to be secured by Letters Patent is claimed below:

1. A select and control system architecture for controlling a plant, comprising:

control logic, having a plurality of error paths and corresponding control dynamic compensations, each of said error paths providing an error path signal, each of said dynamic compensations being operable to compensate the corresponding error path signal and to provide a corresponding control dynamic compensation signal in response thereto, a selected one of said corresponding control dynamic compensation signals controlling said parameter of the plant; and loop select logic, responsive to at least two of said plurality of error path signals, for selecting one of said corresponding control dynamic compensation signals to control said parameter of the plant independent of the values of said corresponding control dynamic compensation signals, and for providing a loop select signal indicative of said selected one of said corresponding control dynamic compensation signals; and control output logic, responsive to said loop select signal, for selectively providing a plant control output signal indicative of said selected one of said corresponding control dynamic compensation signals.

2. The select and control system architecture of claim 1, wherein said select logic further comprises a plurality of corresponding loop select dynamic compensations, each of said corresponding loop select dynamic compensations being responsive to a corresponding one of said error path signals for providing a corresponding compensated select signal, said loop select logic being operable to select one of said compensated select signals to be indicative of said loop select signal.

3. The select and control system architecture of claim 1, wherein said select logic further comprises logic to initialize a selected one of said corresponding loop select dynamic compensations, thereby providing a "bumbless" transfer to said selected one of said corresponding control dynamic compensation signals.

4. The select and control system architecture of claim 1, wherein the plant is a gas generator portion of a gas turbine engine and said parameter of the plant to be controlled is fuel flow to the gas turbine engine.

5. A system for controlling a plant, comprising:
   a. control logic means, including a plurality of error signals, each of the error signals being indicative of any difference between a reference signal indicative of a desired value of a plant variable and a feedback signal indicative of an actual value of the corresponding plant variable, and further including control dynamic compensation logic associated with each one of the error signals, the control logic means comprising means, responsive to the error signals, for providing corresponding control dynamic compensation signals; and
   b. select logic means, responsive to the error signals, for selecting, independently of the values of the control dynamic compensation signals, one of the control dynamic compensation signals to control a parameter of the plant; and
   c. means for controlling the parameter of the plant based on the selected control dynamic compensation signal.

6. The system of claim 5, wherein the select logic means further includes select dynamic compensation logic associated with each one of the error signals, and further comprises means for providing corresponding select dynamic compensation signals, and for selecting form among one of the select dynamic compensation signals and for providing a loop select signal indicative thereof, the loop select signal also being indicative of the one of the control dynamic compensation signals selected to control the parameter of the plant.

* * * * *